Sept. 23, 1958     M. A. GOODBAR ET AL     2,853,232
CHANGE COMPUTING CASH REGISTER
Filed Feb. 23, 1954                                    7 Sheets-Sheet 1
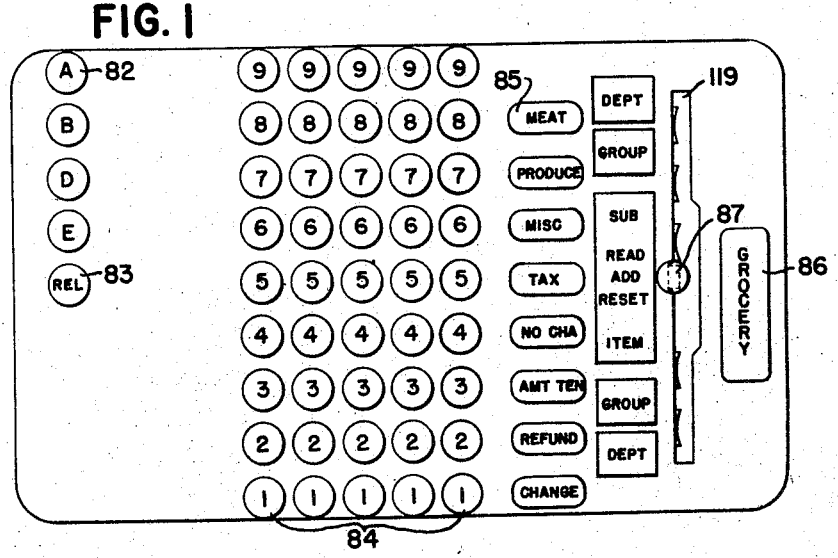
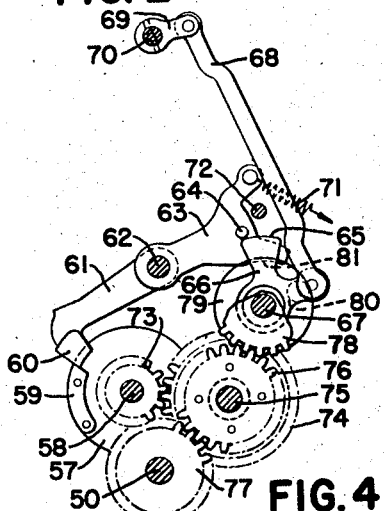
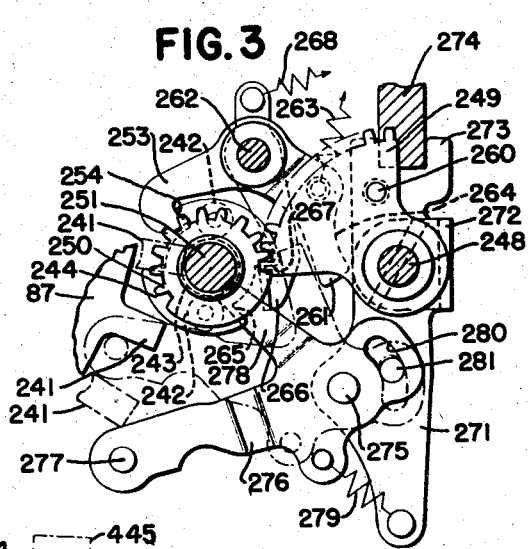
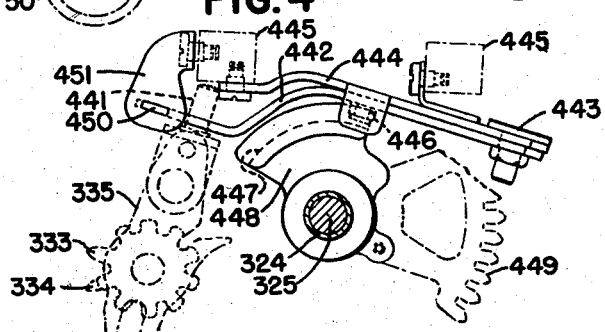
INVENTORS
MAYO A. GOODBAR
GEORGE A. COCUP &
CHARLES T. DONOVAN
BY
THEIR ATTORNEYS Sept. 23, 1958   M. A. GOODBAR ET AL   2,853,232
CHANGE COMPUTING CASH REGISTER
Filed Feb. 23, 1954   7 Sheets-Sheet 2

INVENTORS
MAYO A. GOODBAR
GEORGE A. COCUP &
CHARLES T. DONOVAN
BY
THEIR ATTORNEYS

Sept. 23, 1958     M. A. GOODBAR ET AL     2,853,232
CHANGE COMPUTING CASH REGISTER
Filed Feb. 23, 1954     7 Sheets-Sheet 3

INVENTORS
MAYO A. GOODBAR
GEORGE A. COCUP &
CHARLES T. DONOVAN

BY Earl Beust
Ayres D. Stoddard

THEIR ATTORNEYS

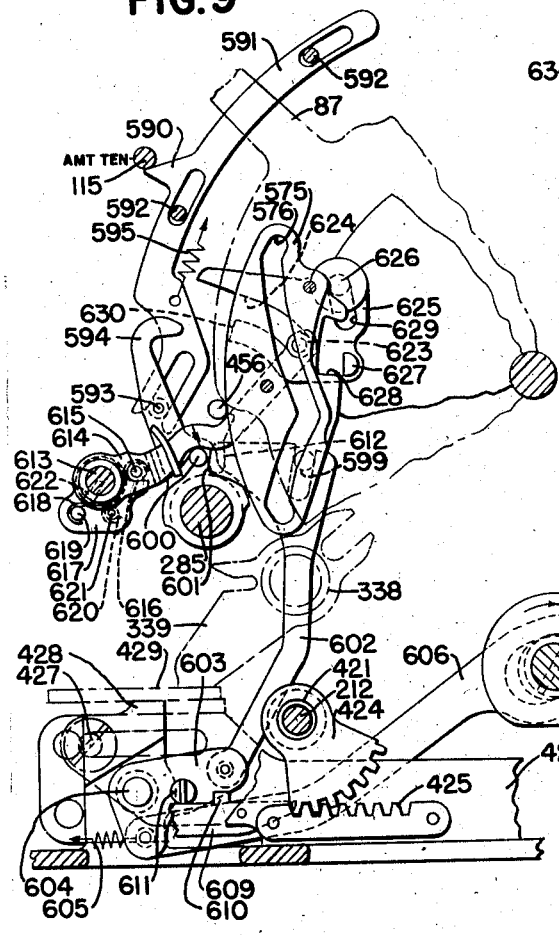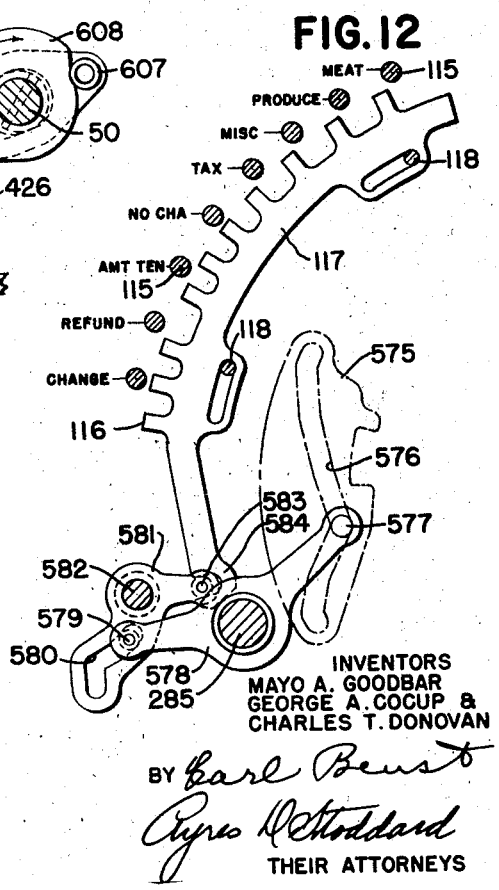

Sept. 23, 1958     M. A. GOODBAR ET AL     2,853,232
CHANGE COMPUTING CASH REGISTER
Filed Feb. 23, 1954                                                                               7 Sheets-Sheet 5
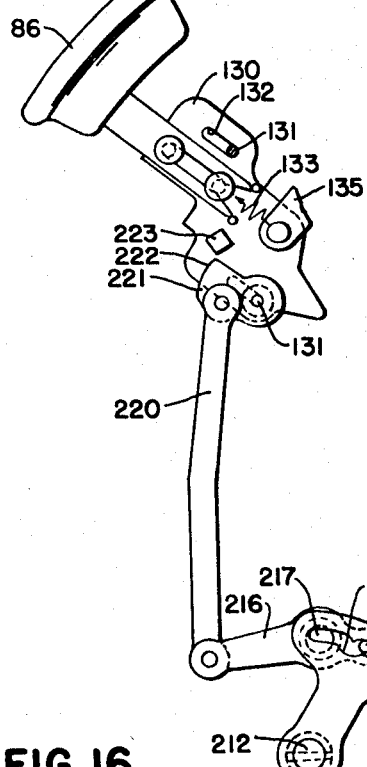
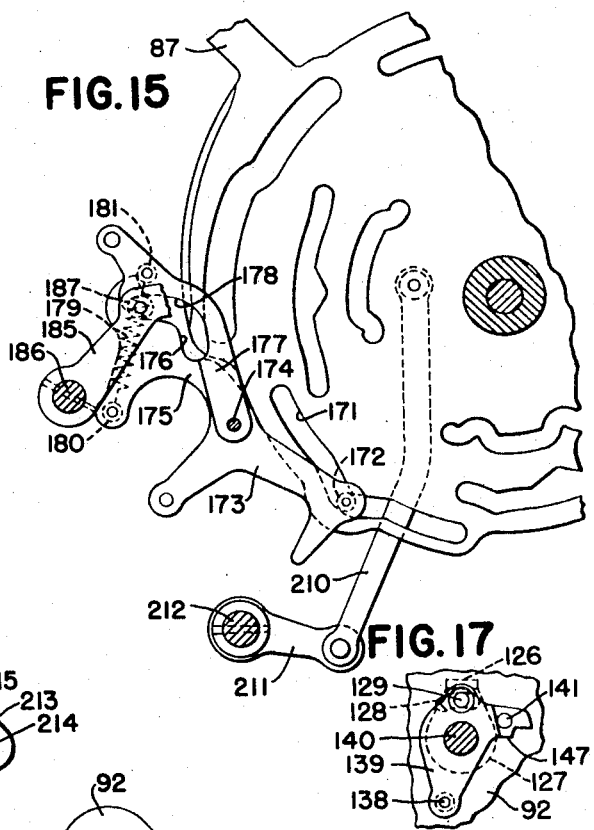
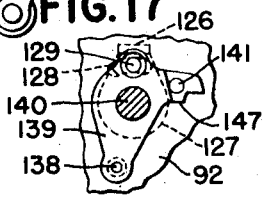
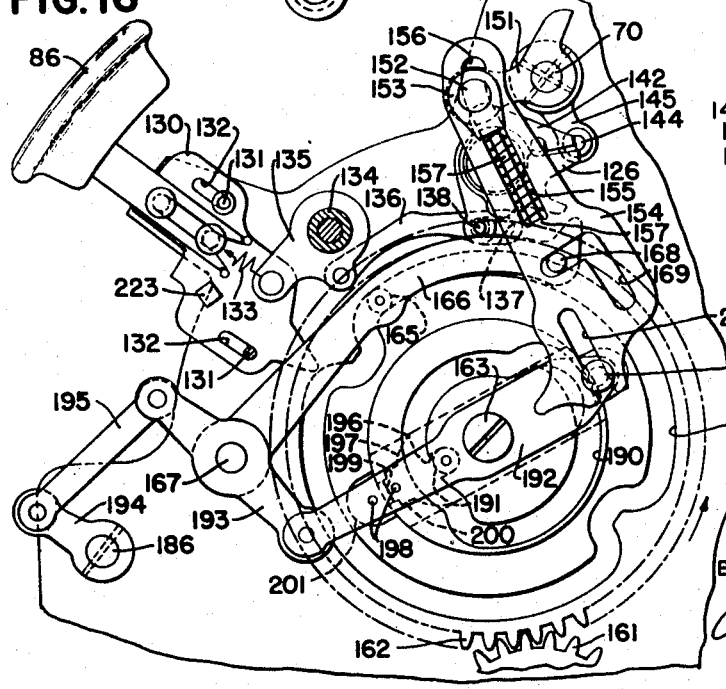
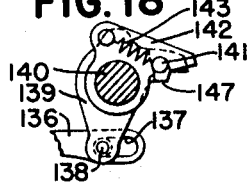
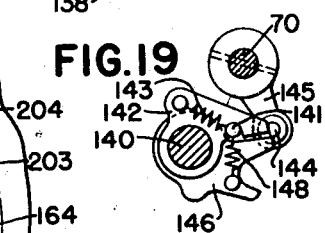
INVENTORS
MAYO A. GOODBAR
GEORGE A. COCUP &
CHARLES T. DONOVAN
BY *Earl Beust*
*Ayres D. Stoddard*
THEIR ATTORNEYS

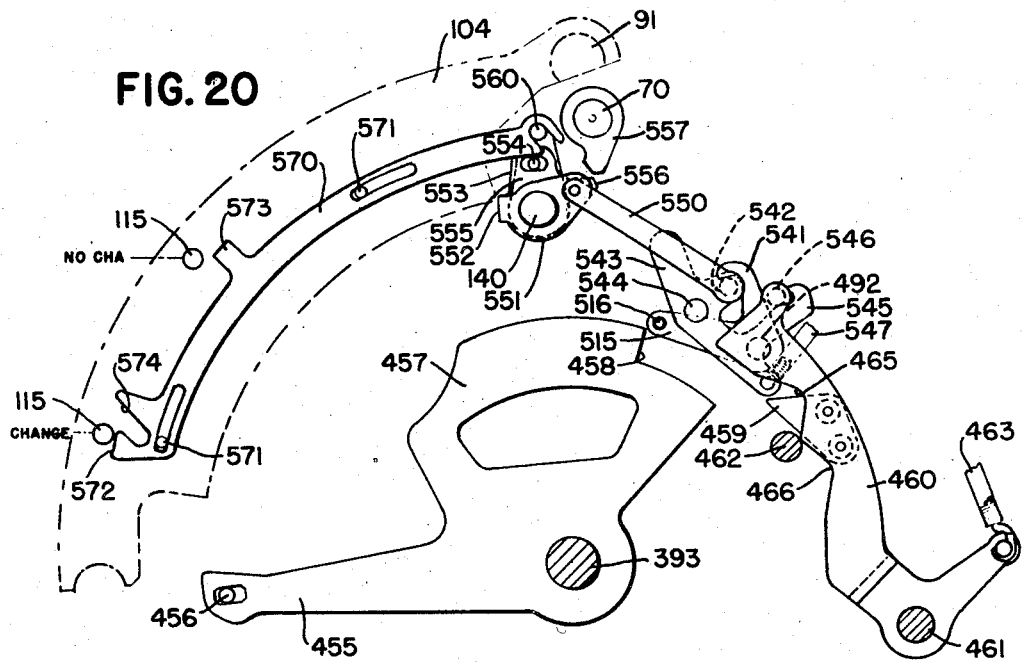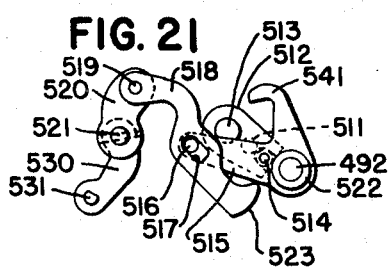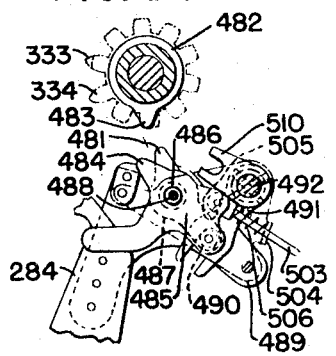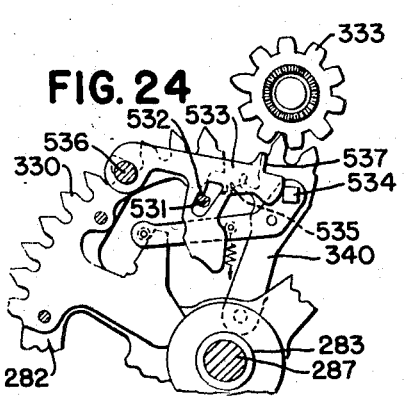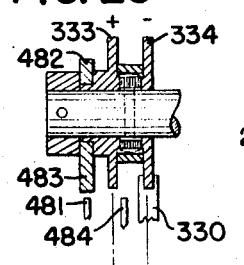

United States Patent Office 2,853,232
Patented Sept. 23, 1958

2,853,232

CHANGE COMPUTING CASH REGISTER

Mayo A. Goodbar, George A. Cocup, and Charles T. Donovan, Dayton, Ohio, assignors to The National Cash Register Company, Dayton, Ohio, a corporation of Maryland Application February 23, 1954, Serial No. 411,809

14 Claims. (Cl. 235—2)

This invention relates to cash registers and the like, of the type shown in Letters Patent of the United States No. 1,865,147, issued to Bernis M. Shipley on June 28, 1932.

This invention is also embodied in the machine illustrated in the application for United States Letters Patent Serial No. 260,998, filed by Mayo A. Goodbar, George A. Cocup, and Kenneth R. Faux on December 11, 1951, which issued into United States Patent No. 2,698,139 on December 28, 1954. Therefore, the machine embodying the present invention is adapted to be used as a straight itemizing cash register similar to that disclosed in the above-mentioned Shipley patent and the Goodbar, Cocup, and Faux patent, and may also be used to automatically compute the change which the customer has coming, provided he tenders an amount greater than the amount of the bill; or it will compute the amount tendered against the amount of the bill, showing that the customer has no change coming back to him when the amount tendered is identical with the amount of the sale.

Therefore, it is an object of this present invention to provide a machine of the above type with mechanism whereby the change is automatically computed against the amount of the sale from the amount of money tendered to pay for the goods purchased.

Another object is the provision of means to indicate the amount of change which the customer has coming when the amount tendered is greater than the amount of the sale.

Another object is to provide a machine of the class described with an Amount Tendered key, a Change key, and a No-Change key, whereby the amount of money tendered is entered in the machine to cause a computation in the machine to determine whether or not the customer has any change coming and, if so, how much.

Another object of the present invention is to provide a machine of the above type with an add-subtract totalizer or crossfooter to be used as an itemizer, in which the amount of change is computed when the machine is used in this particular fashion—that is, used as a change computer—whereby the operator does not have to compute the amount of change from the amount of money tendered to him.

A further object of the present invention is to prevent the motor bar from being operated when the total lever is in the item total position.

A still further object of the present invention is to provide an interlocking mechanism to prevent an operation of the Amount Tendered key or the Change key or the No-Change key when the total lever is in its normal, or "add," position.

Another object of the present invention is to provide an interlocking mechanism between the Amount Tendered key and the total lever, to compel the entry of at least one item—that is, one add operation of the machine—and a plus sub-total operation following this add operation or following a plurality of successive operations which leave the crossfooter in a plus condition, before the Amount Tendered key can be depressed.

With these and incidental objects in view, the invention consists of certain novel features of construction and combinations of parts, a preferred form or embodiment of which is hereinafter described with reference to the drawings which accompany and form a part of this specification.

Of said drawings:

Fig. 1 is a diagrammatic view of the keyboard of the machine.

Fig. 2 shows part of the motor drive and release mechanism in reduced scale.

Fig. 3 is an enlarged detail view of a part of the mechanism for restoring the total lever to its "add" position from either the first position above or the first position below "add."

Fig. 4 is a detail view of the crossfooter or add-subtract totalizer shifting mechanism.

Fig. 9 shows the interlocking mechanism between the Amount Tendered key and the total lever to compel the entry of at least one item—that is, one add operation of the machine—and a plus sub-total operation following this add operation or following a plurality of successive operations, which leaves the crossfooter in a plus position, before the Amount Tendered key can be depressed.

Fig. 10 is a facsimile of a check or receipt printed by the machine, showing that several items were purchased, a refund was made to the purchaser, and the purchaser tendered the exact amount of money for that sale.

Fig. 11 is a facsimile of a check or receipt printed by the machine, showing that several items were purchased and that the purchaser tendered an amount of money greater than the amount of the sale, and also showing the amount of change computed by the machine and given to the purchaser.

Fig. 12 is a detail showing the transaction bank locking control bar as controlled by the total lever.

Fig. 13 is a facsimile of the detail strip or sales journal strip printed by the machine and shows what is printed in connection with and during the two transactions during which the checks of Figs. 10 and 11 were printed.

Fig. 14 is a detail view of the mechanism for locking the motor bar against depression when the total lever is in the item total position, which is the first position below the normal, or "add," position.

Fig. 15 shows a part of the total lever and a part of the cycle control mechanism.

Fig. 16 shows the machine-releasing mechanism and the cycle control mechanism.

Fig. 17 shows part of the machine-releasing mechanism.

Fig. 18 shows a part of the means for tripping the machine-releasing mechanism.

Fig. 19 shows a part of the means for tripping the machine-releasing mechanism.

Fig. 20 shows the overdraft control of the machine-releasing mechanism and the interlock between the Change key and the No-Change key.

Fig. 21 shows the control of the transfer mechanism to the lowest order denomination from the highest order denomination under control of the overdraft mechanism, and shows the overdraft latch.

Fig. 22 shows the auxiliary drive between the overdraft mechanism of Fig. 23 and the overdraft latch in Fig. 21.

Fig. 23 shows the overdraft mechanism for the crossfooter or add and subtract totalizer on the upper totalizer line.

Fig. 24 shows the transfer mechanism to the lowest order denomination.

Fig. 25 is a diagrammatic view of the overdraft tripping means and the crossfooter shifting cam.

General description

Described in general terms, the machine in the preferred form of embodiment comprises a plurality of totalizers, one for each classification of transactions and one for totalizing the items of each separate transaction, the latter being known as an itemizing totalizer, which is cleared at the end of each multiple-item operation and each single-item operation.

This itemizing totalizer in the present machine is located on the upper totalizer line and is what is known in the art as a crossfooter or an add and subtract totalizer.

In this particular type of machine, the total is taken after the several items of a multiple-item transaction have been entered, and also, when a transaction consists of a single item, the total is taken of that single item.

These totalizers are operated by a differential mechanism under the control of their manipulative means, which in this case are the usual amount keys.

The differential mechanism provides means for adjusting a printing mechanism, a portion of which is shown in this case, to print the sales journal strip, and also a printing mechanism to print on issuing receipts, which printing mechanism is not shown in this application but which is substantially identical with that shown in the above-mentioned Shipley Patent No. 1,865,147.

In this particular case, all of the transaction keys are "motorized," as well as the regular motor bar. In other words, the depression of any one of the transaction keys releases the machine for operation provided there is a clerk's key depressed prior to the depression of one of these transaction keys.

The clerks' keys are what are known in the art as "stay-down" keys, and, when one of them is depressed, it will stay down until released by the release key in that bank. In other words, if the clerk A key is depressed, it will remain depressed all during several successive complete transaction operations of the machine, as long as the same clerk is operating the machine. Therefore, it is unnecessary for the clerk to depress this key at the beginning of each operation. Consequently, the keys in the transaction bank are truly motorized keys; that is, they will release the machine or cause it to be tripped so that it will be operated upon depression of that key during adding operations. However, there are, as above mentioned, interlocks in the machine to prevent operation of the Change, the Amount Tendered, and the No-Change keys while the total lever is in its add, or normal, position.

In the specific example shown, the transaction keys are used for meat, produce, miscellaneous, tax, no change, amount tendered, refund, and change. These keys, as shown in Fig. 1, are all in the transaction bank.

Figure 5:
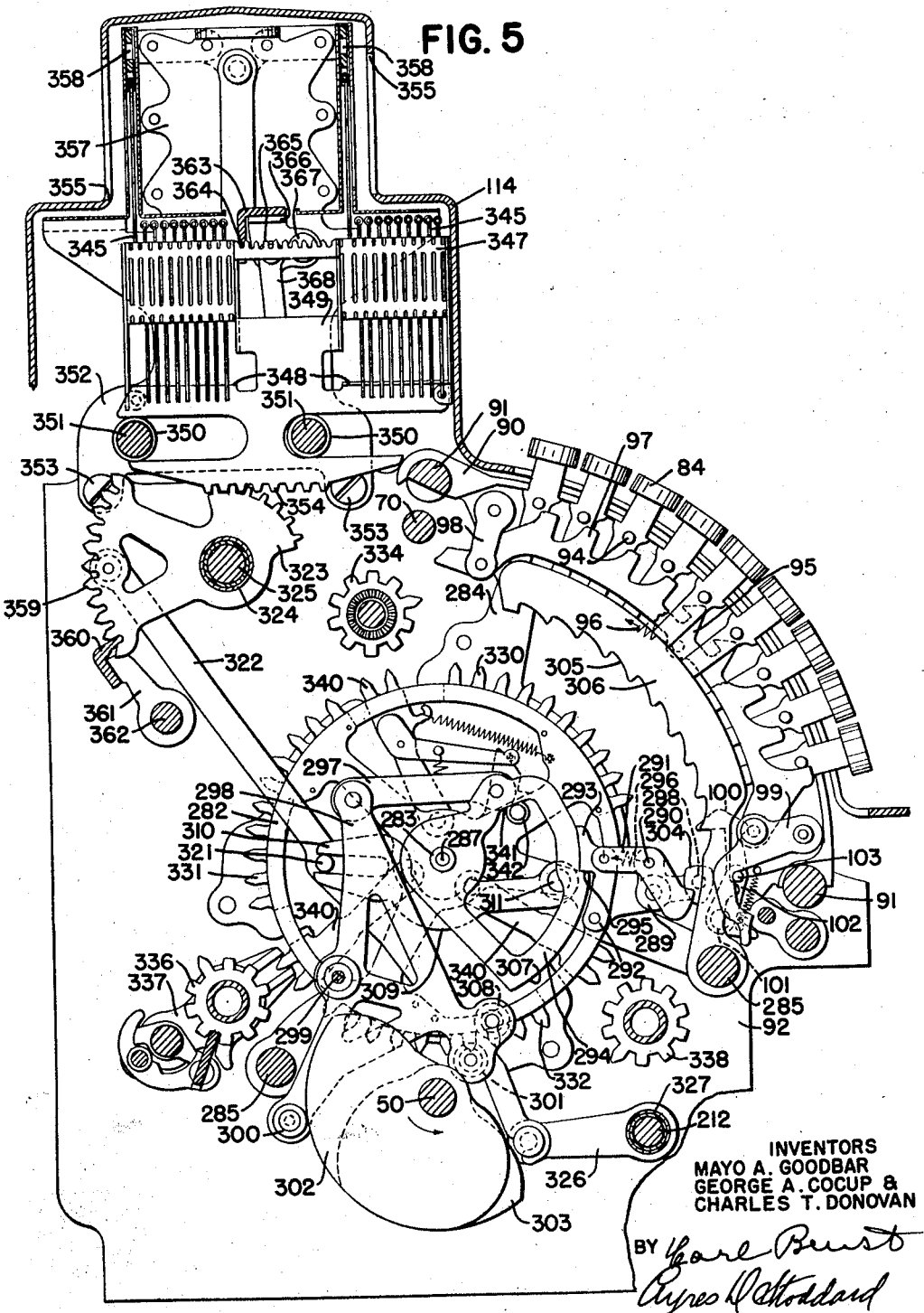
Fig. 5 is a section taken to the left of one of the amount banks of keys, showing the differential mechanism and the indicators associated with said amount bank.

The motor bar is used when amounts for groceries are entered, and therefore the motor bar has inscribed thereon the term "Grocery." The totalizers associated with the keys in this bank are on the front totalizer line, which is shown in Fig. 5. On this line there is a totalizer associated with the Meat key, the Produce key, the Miscellaneous key, the Tax key, and the Refund key. There is also a totalizer on this front line associated with the Grocery motor bar. There are no totalizers associated with the No-Change key, the Amount Tendered key, or the Change key.

The upper totalizer line, as above mentioned, carries one totalizer, which in this particular instance is a crossfooter or an add-subtract totalizer and which totalizer is cleared at the completion of the registration of each transaction. In other words, this totalizer may be cleared at the end of the taking of the item total, or it may be cleared upon the entering into the machine of a No-Change operation, or the entering into the machine of a Change operation. Whenever it is necessary to press the Change key, it means that the crossfooter is in a negative condition; that is, an amount of money was tendered to the operator of the machine which was greater than the amount of the sale. Therefore a subtracting operation took place in the crossfooter, and the crossfooter was left in a negative condition. When the crossfooter is in this condition, only the Change key can be depressed to cause an operation of the machine, and this particular operation causes the amount of change to be indicated and causes a clearing of the crossfooter or add-subtract totalizer.

Should the customer give the clerk the exact amount of money, then the amount tendered would be registered in the machine and subtracted from the crossfooter, so that at the end of this operation the crossfooter would stand at 000. Therefore, the No-Change key only can be operated, and the indication at this time will be 000 total.

Sequence of operations

The sequence of operations when the machine is used as a change computer is as follows:

First, the operator will depress the proper clerk's key, as shown in the left-hand bank in Fig. 1. The amount keys will then be depressed, showing the amount of the particular item being registered and the name of that item, whether it be meat, produce, or groceries. If it be meat or produce, the respective key will be depressed. If it be groceries, then the Grocery motor bar will be depressed. Then, upon the entry of each successive item, the amount of that item and the type of the item will be registered by depression of the amount keys and the particular key in the transaction bank or the Grocery motor bar.

After all of the items have been entered, the operator then moves the total lever to the sub-total position, which is the first position above add, and depresses the motor bar. This will print the amount of the sub-total on the check and on the sales journal strip.

It might be well to state here that the amount of each individual item has been previously printed upon the check but not on the sales journal strip. The amount of the sale with the total will shown on the indication. The total lever is automatically returned to its normal add position during this sub-total operation.

The next operation is to enter, by means of the amount keys, the amount of money received from the customer and depress the Amount Tendered key in the transaction row. This prints the amount tendered on the check and also on the sales journal strip and subtracts the amount tendered from the amount in the crossfooter, previously shown as the sub-total.

The next operation is to move the total lever to the Item Total position, which is the first position below the add position, and then depress the Change key, provided the amount of money tendered was greater than the amount of sale (i. e., the previously indicated sub-total). At this time, if the amount of money tendered was equal to the amount of the sale, the No-Change key, and that key only, could be depressed. However, since we have assumed that the amount tendered was greater than the amount of the sale, the operator depresses the Change key. During this operation, the amount of change and the word "Change" will show on the indication and will be printed on the check and on the sales journal. The check is issued, the cash drawer is opened, and the crossfooter or add-subtract totalizer on the top line is cleared.

The machine is provided with the following interlocks:

The Grocery motor bar is locked out; that is, it is prevented from being depressed when the total lever is in the Item Total or first position below the add position.

The Change key and the No-Change key are locked out; that is, they are prevented from being depressed when the total lever is in its add position. The Change key and the No-Change key are locked out against each other; that is, when one is depressible, the other is not depressible, and vice versa.

A sub-total operation, with a plus amount in the listing, or item, totalizer—that is, the crossfooter or add-subtract totalizer on the top line—must precede each amount tendered operation. In other words, there must be a plus amount in this totalizer before the Amount Tendered key can be depressed.

If, after the taking of the sub-total, there were some taxable items, the amount of tax would be set up on the keyboard and the Tax key depressed, and that would be added to the total in the crossfooter, and then another sub-total would be taken so as to show the amount of money which the customer owes.

If at this particular time there should also be a refund due the customer from the return of bottles, from coupons, or from newspaper advertising or other types of advertising, the amount of the refund is set up on the keyboard, and the Refund key is depressed. This refund operation, of course, is a subtract operation, and after the refund operation another sub-total may be taken so as to show just exactly how much money the customer owes.

It may be done this way, or the sub-total or the refund operation may be a separate operation after the completion of the transaction involving the registration of the various items which the customer has purchased. However, as above mentioned, it may be considered as a part of the complete transaction and registered in connection with that transaction, as above mentioned, and, of course, then a sub-total must again be taken, so that the operator will know how much money is due, so that, when the amount tendered is given, this amount may be entered, so that the proper change may be computed, if the customer has change coming to him, and to show 0.00 when no change is needed.

*Operating mechanism*

The machine shown herein is adapted to be operated by an electric motor of the well-known type illustrated and described in United States Patent No. 1,144,418, granted to Charles F. Kettering and William A. Chryst on June 29, 1915. For a detailed description of the same, reference may be had to that patent.

Only a part of the motor clutch mechanism is shown in the accompanying drawings, and, for a more detailed description of the clutch mechanism, reference may be had to the above-mentioned Kettering and Chryst patent, and also to United States Patent No. 1,817,883, issued to Bernis M. Shipley on August 4, 1931.

The motor is mounted on the left side of the machine, and the clutch mechanism between the motor and the machine includes a spring-actuated disk 57 (Fig. 2) mounted on a stud 58. The disk 57 carries a block 59, which normally contacts the forward end 60 of an arm 61, pivoted on a stud 62 on the frame of the machine. An arm 63, secured to the arm 61, carries a pin 64, which normally rests on a curved edge 65 of an arm 66, pivoted on a printer drive shaft 67, journaled in the printer frame.

The arm 66 is connected by a link 68 to an arm 69, secured to a shaft 70, extending across the entire machine and known herein as the machine release shaft.

When the arm 69 is rocked clockwise (Fig. 2) to release the machine, as will be described hereinafter, the arm 66 is rocked clockwise from beneath the pin 64, permitting a spring 71, attached to the arm 63 and to a pin (not shown) projecting from the machine side frame, to move the end 60 away from the block 59 on the spring-actuated disk 57, which is a part of the motor clutch mechanism.

The clockwise movement of the arm 63 is limited by a pin 72, carried by the machine frame. Upon release of the arm 61 from the block 59, the disk 57 is moved clockwise by a spring (not shown), causing an effective connection between the motor and the driving clutch to operate the machine, as is fully illustrated and described in the above-mentioned Kettering and Chryst Patent No. 1,144,418.

A main drive shaft 50 is driven from a gear 73 (Fig. 2) secured to the driving clutch. Said gear 73 meshes with an intermediate gear 74, freely mounted on a stud 75, supported in the side frame of the machine. Pinned to the gear 74 is a gear 76, which meshes with a gear 77, secured to the main drive shaft 50. The gear 76 also meshes with a gear 78, secured to the printer drive shaft 67. The main drive shaft 50 and the printer drive shaft 67 make one complete rotation during an adding operation of the machine.

The arm 61 is restored to locking position at the end of the operation of the machine by a disk 79, pinned to the shaft 67. This disk 79 carries a pin 80, which engages a curved edge 81 of the arm 63 to restore the arm 61 to stop the machine. This permits return of the arm 66 and consequently the shaft 70 to their home positions.

*Keyboard*

The keyboard mechanism of the present invention, illustrated in this machine, is similar to that shown and described in the above-mentioned Shipley patents.

*Clerks' keys.*—As shown in Fig. 1, the keyboard comprises at the left a bank of clerks' keys 82, a release key 83 in this clerks' bank, five banks of amount keys 84, a bank of transaction keys 85, a motor bar 86, and a total lever 87.

The clerks' keys are what are known in the art as stay-down keys, and one of these keys 82 must be depressed to free the machine release shaft 70 by mechanism which is very old in the art and fully illustrated and described in the above-mentioned Shipley Patent No. 1,865,147. This clerk's key, whichever one is depressed at the beginning of the entry of a transaction, whether it be a single-item transaction or a multiple-item transaction, will stay depressed at the end of the operation of the machine and will continue to stay depressed until released by the depression of another clerk's key, or by the depression of the release key 83 in this bank. This mechanism is old, as above mentioned, and it is not thought necessary to described it herein. Suffice it to say that, when one of the keys 82 is depressed, it frees the machine release shaft 70 so that it can be released by the depression of any one of the keys 85 in the transaction row, or by the motor bar 86.

Figure 7:
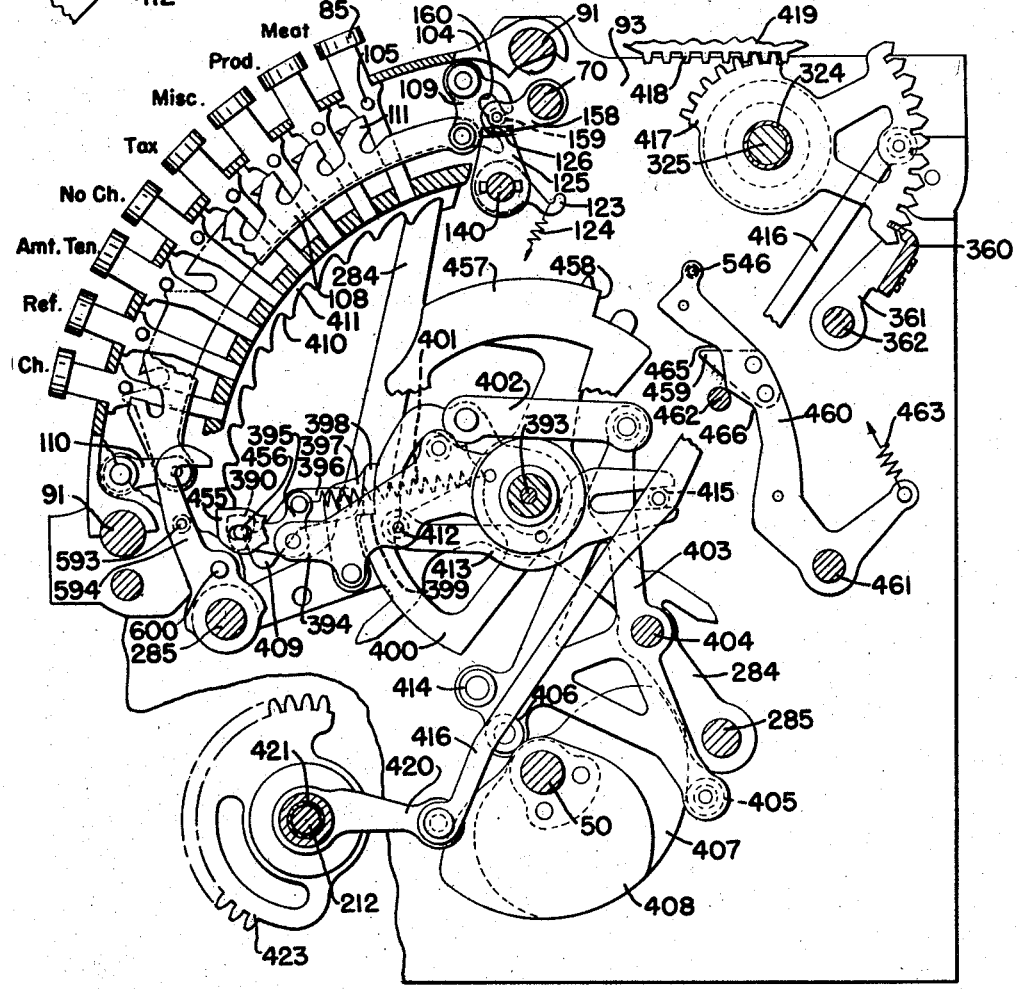
Fig. 7 is a sectional view of the transaction bank of keys and its associated differential mechanism.

*Amount keys.*—The amount keys 84 in each bank are numbered 1 to 9. One of the banks of keys 84 is shown in detail in Fig. 5. All of the amount keys 84 are identical, and they are all mounted in the same type of frames; therefore the description of this one bank shown in Fig. 5, it is believed, will be sufficient for all. The keys 84 of each of the amount banks are mounted in an individual frame 90, mounted on cross rods 91, supported by a right side frame 92 (Fig. 5) and a left side frame 93 (Fig. 7). These two side frames 92 and 93 support all of the other cross shafts and rods in connection with this machine. The keys 84 are retained in their normal outer positions by the usual compression springs (not shown herein).

Each of the keys 84 carries a pin 94, extending from both sides of the key. That part of the pin 94 which extends to the right side of the key, as viewed in Fig. 5, cooperates with a usual retaining detent 95, which is normally held in the position shown in Fig. 5 by a spring 96, to retain any depressed key in its depressed position. Depression of the key causes its stud to move the detent 95 downwardly until the pin is past the hook of the detent, whereupon the spring 96 restores the detent 95 to the position shown to retain the key in its depressed position until released by the machine near the end of the operation. This is well known in the art.

Cooperating with the keys 84 and their pins 94 is a control bar 97, mounted on arms 98 and 99, supported by the key frame 90. These keys 84, as is well known in the art, when they are depressed, control the differential positioning of a differential mechanism to be described hereinafter, which is shown in Fig. 5. Also associated with each bank of amount keys is a zero stop pawl 100, which is mounted on a shaft 101, supported in the key frame 90. Also secured to the shaft 101 is an arm 102, carrying a pin 103, cooperating with the arm 99.

From the above description it can be seen that, whenever any one of the amount keys 84 is depressed, its pin 94 moves the control bar 97 downwardly, whereupon the arm 99, through its engagement with the pin 103, rocks the arm 102, the shaft 101, and the zero stop pawl 100 clockwise from the position shown in Fig. 5 into a position wherein it will not be engaged by the differential latch mechanism to be described hereinafter, and consequently the differential will be positioned under control of the key depressed.

However, when no key in a bank is depressed, the zero stop pawl will remain in the position shown and cause the differential mechanism to be stopped in its zero position.

*Transaction keys.*—The transaction key bank (Figs. 1 and 7) includes the eight keys 85, designated "Meat," "Produce," "Misc.," "Tax," "No Change," "Amount Tendered," "Refund," and "Change." In this present invention, all of these transaction keys 85 are motorized; that is, upon depression of any one of the keys of this bank (when one of the clerks' keys 82 has been previously depressed), the machine is released for operation.

The fact that all of these keys 85 are motorized keys makes for much faster operation in stores using the check-out system, for which the machine embodying the present invention is particularly adapted to be used. This release of the machine is, of course, without the necessity of depressing the motor bar 86 in conjunction with the keys 85, which was previously the case in the machines such as those shown in the Shipley patents above referred to. These transaction keys 85, as shown in Fig. 7, are carried by a key frame 104, supported on the previously-mentioned rods 91. These keys 85 are held in their normal, outer, positions by the usual key springs (not shown), which springs are also used to restore the depressed keys to their normal positions at each operation, as is old and well known in the art.

Figure 6:
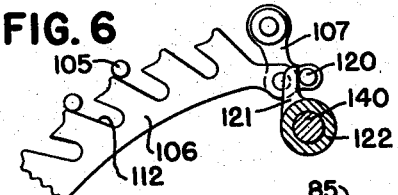
Fig. 6 shows a part of the transaction bank machine release bar.

Each of the transaction keys 85 is provided with a pin 105 (Fig. 6). These pins cooperate with a machine-releasing bar 106, mounted on a pair of arms 107 (only one of which is shown), which arms are carried by the key frame 104. These pins 105 also cooperate with a locking detent 108, carried by arms 109 and 110 (Fig. 7), which are mounted on the key frame 104. The detent 108 is provided with locking noses 111, which, when the detent is moved to the right, as viewed in Fig. 7, upon release of the machine and by means to be described hereinafter, will engage over the top of the pin 105 of the depressed key and will be positioned beneath all of the rest of the pins 105 on the undepressed keys and prevent those keys from being depressed, while at the same time locking in depressed position the particular key 85 which has been depressed. The above-described release of the machine is accomplished in certain instances upon depression of any of the keys 85, when their pins, by contact with the slot 112 of the bar 106, move the bar 106 downwardly or toward the left, as viewed in Fig. 6, to operate part of the machine release mechanism, which will be described hereinafter.

Each of the keys 85 is also provided with another pin 115 (Fig. 12), in axial alignment with the pins 105. These pins 115 cooperate with lugs 116 on an interlocking bar 117, mounted to slide on pins 118, which in turn are carried by the key frame 104.

The bar 117 is shown in Fig. 12 in its normal position, wherein the lugs 116 are directly beneath the pins 115 of the Change and No-Change keys to prevent depression of either one of these keys when the total lever 87 is in the add position. This interlocking bar 117 is adapted to be moved by the total lever 87 by means to be described hereinafter.

*Grocery motor bar.*—The Grocery motor bar 86 is used in add operations to release the machine and select a totalizer into which are accumulated the amounts paid for groceries purchased. During sub-total operations, the motor bar 86 acts to release the machine for operation and does not select a totalizer for addition.

*Total lever.*—The total lever 87 is adapted to be moved upwardly or downwardly in a slot 119 to positions opposite the captions which are designated alongside the leverway, as shown in Fig. 1.

The total lever 87 is used, as has been fully illustrated and described in the above-mentioned Shipley Patent No. 1,865,147, for the purpose of controlling the machine for various types of operations, such as add, sub-total, and total operations.

Specific example

This particular machine, to which the present invention is applied, is what is known as an itemizing totalizer machine, and each of the particular transactions, whether it be a single-item transaction or a multiple-item transaction, is totaled at the completion of that transaction by moving the total lever 87 down one step from its add position, which is shown in Fig. 1.

In connection with the change computation, of course, as above mentioned, after the several items, such as meat, produce, and groceries, have been registered, the operator moves the total lever 87 up one step into a sub-total position and then presses the motor bar 86, which causes an operation of the machine to indicate on the indicators, to be described hereinafter, the amount of the customer's purchase. Assume that the amount was $3.00 and that the customer tendered the operator or clerk a $5.00 bill. When this occurs, the operator sets up $5.00 on the amount keys 84 and presses the Amount Tendered key, which releases the machine. The amount $5.00 is indicated and printed. The operator then moves the total lever 87 into the first position below the add position, which is the item total position, and presses, in this particular case, the Change key, because the totalizer is in a negative condition; therefore the No-Change key is locked out, and only the Change key can be depressed at this particular time. Upon the depression of the Change key 85, the machine is released, and a normal operation follows, near the end of which the total lever 87 is automatically restored to its normal add position, the cash drawer is opened, the receipt is issued, and the indicators are set, showing the amount of change, which in this particular case is $2.00. During this last operation, the machine automatically computed the amount of change which the customer had coming out of the $5.00 which he tendered to the operator of the machine.

It might also be well to state at this time that, near the end of the operation wherein the total lever 87 was moved up one step to the sub-total position, this lever was automatically returned to its add position near the end of this sub-total operation, so that it is no longer necessary for the operator to return the total lever manually from either the sub-total position or the item total position.

The entire mechanism of this machine is completely enclosed in a casing or cabinet 114, a portion of which is shown in Fig. 5, to prevent unauthorized persons from gaining access to the various parts of the mechanism. However, this cabinet 114 is provided with the proper openings, which are enclosed by doors under lock and key, so that access may be had to parts of the machine when it is necessary, for example, to replace the paper rolls for the receipt or check paper, and also to replace the roll for the sales journal or detail strip. None of such openings are shown in this application, but they are old and well known.

*Machine release mechanism*

As has been mentioned above, the machine is released upon the operation of any of the keys 85 of the transaction bank, and it is also released upon depression of the Grocery motor bar 86. However, as above mentioned, there are certain interlocking features which prevent the depression of the No-Change key 85, the Amount Tendered key, and the Change key when the total lever 87 is in the add position.

The Amount Tendered key 85 cannot be depressed until after a sub-total is taken; that is, until after the total lever 87 has been moved to the sub-total position and a sub-total of the amount in the crossfooter has been taken, which sub-total must be a positive amount or, in other words, a plus amount. If there should be a negative amount in the crossfooter when the total lever 87 is moved to the sub-total position, the machine cannot be released by depression of the motor bar 86 because of the overdraft condition of the totalizer. However, if there is a plus amount in the crossfooter when the total lever 87 is moved up one step to the sub-total position, then the machine can be released by depression of the motor bar 86. Then, when the lever 87 is automatically returned to its normal position during this operation, the Amount Tendered key has been released or unlocked, so that now the operator may receive the amount of money tendered by the customer, may enter that amount on the amount keys, and may press the Amount Tendered key 85 to release the machine. This amount tendered will then show on the indicators and will be printed. After this operation, the operator moves the total lever to the first position below add, which is the item total position, and this will unlock either the Change key or the No-Change key, depending upon the amount of money that was tendered. If an exact amount of money was tendered—that is, if the amount of money tendered was identical with the amount of the sale—then the No-Change key 85 is unlocked and can be depressed. However, if the amount tendered was more than the amount of the sale, then only the Change key 85 can be depressed, and this operation will show the amount of change which the customer is to receive, the machine automatically computing this amount. On the other hand, when the amount tendered is identical with the amount of the sale and the No-Change key is depressed, when the total lever 87 is in the item total position, the crossfooter will be restored to zero, and the amount to 0.00 total will be indicated, showing that the customer has no change coming.

The means whereby the depression of any of the above transaction keys 85 and the Grocery motor bar 86 releases the machine for operation will now be described in detail.

In order to release the machine for operation, it is necessary that the shaft 70 (Fig. 16) be released, so that it can be rocked clockwise by means to be described hereinafter, in order to free the clutch arm 61 (Fig. 2) to release the motor clutch, whereby the motor may drive the machine in the manner previously described.

The means whereby the depression of the motor bar or Grocery key 86 will release the machine for operation will be described first, with particular reference to Figs. 16 to 19. The Grocery motor bar 86 is detachably mounted on a slide 130, which is supported by two studs 131, projecting into slots 132 in the slide 130. These studs 131 are mounted in the right side frame 92 of the machine. The Grocery bar 86 is maintained in its normal, outer, position by a spring 133. The slide 130 is connected to an arm 135, pivoted on a bearing 134. Pivoted to the arm 135 is a link 136, having a slot 137, surrounding a pin 138 on an arm 139 pivoted on a shaft 140, supported by the machine side frames 92 and 93. This arm 139 carries a stud 141 (Figs. 17, 18, and 19), which rests in a notch in a trip pawl 142. A spring 143 holds the pawl 142 in engagement with the stud 141.

When the trip pawl 142 is so held in contact with the stud 141, the right end of the trip pawl 142 lies directly in front of a flattened stud 144 on an arm 145, secured to the machine release shaft 70.

From the above-described train of mechanism, it can be clearly seen that, upon depression of the Grocery motor bar 86, through the arm 135, the link 136, and the arm 139, the stud 141 raises the trip pawl 142 counter-clockwise and moves the front end of the trip pawl away from the flattened stud 144. When this occurs, the stud 144 moves beneath the right end of the trip pawl 142, thus permitting a spring 155 (Fig. 16) to operate the machine release shaft 70 in a clockwise direction, and the spring 133 immediately restores the bar 86 to its normal position.

Near the end of the operation of the machine, the shaft 70 moves back to and past its home position. Consequently the stud 144 moves out from under the trip pawl 142 and past the end of a non-repeat pawl 146. The non-repeat pawl 146 is provided to prevent repeat operations if the Grocery bar 86 should be held depressed during the entire operation of the machine. This non-repeat pawl 146 is normally held against a shoulder 147 on the arm 139 by a spring 148, but, when the bar 86 is depressed, the arm 139 and the shoulder 147 are elevated out of contact with the non-repeat pawl 146, and the stud 144 prevents the pawl 146 from following the arm 139.

If the Grocery motor bar 86 is held depressed during the entire operation of the machine, thus holding the arm 139 elevated, then, near the end of the operation of the machine, when the shaft 70, the arm 145, and the stud 144 are moved back past their home positions and past the end of the non-repeat pawl 146, the spring 148 will rock the non-repeat pawl 146 upwardly until it contacts the elevated arm 139, thus locking the machine against another operation. In this position, the end of the non-repeat pawl 146 is in the path of the stud 144; consequently the machine cannot be released, even though the Grocery motor bar 86 is held depressed and the arm 139 remains elevated. When pressure is removed from the bar 86, the spring 133 restores the bar 86 to normal position, and the non-repeat pawl 146 is returned to normal position by the arm 139 through its shoulder 147, by the spring 143, upon counter-clockwise movement of the machine release shaft 70, by the usual and well-known hand release lever, not shown herein but shown and described in United States Patent No. 1,839,371, issued to Samuel Brand on January 5, 1932.

As previously stated, whenever any one of the transaction keys 85 is depressed, the machine-releasing bar 106 (Fig. 6) is moved to the left, whereupon the arm 107 is rocked clockwise. This arm 107 carries a pin 120, with which cooperates a finger 121, secured to a hub 122, mounted to turn freely on the shaft 140. Also secured to the hub 122 is an arm 123, having connected thereto a spring 124, the tension of which holds the finger 121 normally against the pin 120.

Figure 8:
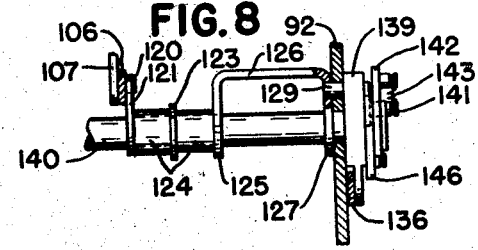
Fig. 8 is an edge view showing part of the machine release control means.

Connected to the end of the hub 122 (Figs. 7 and 8) is an arm 125, which is connected by a bail 126 to another arm 127 (Figs. 8 and 17), pivoted on the shaft 140. This arm 127 has a slot 128, into which projects a pin 129 on the previously described arm 139.

Upon movement of the releasing bar 106 to the left (Fig. 6), the pin 120 rocks the finger 121, the hub 122, the arm 125 (Figs. 7 and 8), the bail 126, and the arm 127 counter-clockwise, thus moving the pin 129 (Fig. 17) to the left, which rocks the arm 139 counter-clockwise to cause its stud 141 to raise the trip pawl 142, as above described, to release the shaft 70 and cause operation of the machine.

When the trip pawl 142 is moved counter-clockwise (Figs. 18 and 19) to move its right end from in front of the flat stud 144 of the arm 145, the shaft 70 is rocked clockwise by the following means:

Secured to the shaft 70, on the outside of the right side frame 92 of the machine, as shown in Fig. 16, is an arm 151, carrying a stud 152, supporting two spring-retaining pilots 153, placed on opposite sides of a link 154, which is slotted to move over the stud 152. Only one of the retaining pilots 153 is shown. A coil spring 155, surrounding the lower ends of these pilots 153, is compressed between the shoulders on said pilots and the end wall of a slot 156 in the link 154. The spring 155 is guided by a finger 157, which projects upwardly in the slot in the link 154.

From the above description it can be seen that, upon depression of any of the keys 85 or 86, the trip pawl 142 is moved counter-clockwise in the manner previously described, and the spring 155 is released to rock the shaft 70 clockwise to release the motor clutch mechanism previously described.

Upon such clockwise movement of the shaft 70, an arm 158 (Fig. 7), secured thereto, causes a pin 159, by its engagement with a slot 160 in the arm 109, to rock said arm 109 counter-clockwise to move the locking detent 108 to cause the nose 111 to lock the depressed key 85 in its depressed position and cause the remaining noses 111 to lock out all unoperated, or undepressed, keys 85.

The mechanism for rocking the machine release shaft 70 counter-clockwise from its released position back to its normal position will now be described. Secured to the main cam shaft 50 of the machine is a gear 161 (Fig. 16), which meshes with a large gear 162, pivoted on a stud 163, carried by the right side frame 92 of the machine. This gear 162 has a cam race 164, into which projects a roller 165, carried by an arm 166, pivoted on a stud 167, also carried by the machine frame 92. This arm 166 also carries a pin 168, projecting into the horizontal portion of a bayonet slot 169 in the previously-described link 154.

It will be remembered that, when the machine is released, the shaft 70 is rocked clockwise by the spring 155 and the stud 152 is moved into the upper part of the slot 156 of the link 154. The race 164, through the roller 165, rocks the arm 166 first clockwise and then counter-clockwise, to normal position. During the clockwise movement of the arm 166, the pin 168 moves the link 154 down and consequently rocks the arm 151 and the shaft 70 counter-clockwise slightly past normal position, and then causes said arm 151 and shaft 70 to be set slightly clockwise into normal position, as shown in Fig. 16.

It might be well to state here that the gear 162 receives only one half-rotation for each full rotation of the gear 161; consequently there are two camming portions of the cam race 164, as shown in Fig. 16, the reason for this being that during sub-total and total operations, as fully described in the above-mentioned Shipley Patent No. 1,865,147, this gear receives a full rotation, which gives two complete rotations to the shaft 50. It might also be well to state here that, when the machine is operated by handle, the handle is mounted on the bearing 134, and a pinion (not shown), driven by the handle, meshes with the gear 162 to turn the gear 162 directly by means of the hand-operated handle, which also is not shown in this case, to drive the gear 161 and consequently the main cam shaft 50.

*Total lever.*—The total lever 87 is provided, as has been stated previously, as is usual in machines of this type, for controlling the machine for total-taking and sub-total-taking operations. The total lever 87 is shown in Fig. 15 in its normal, adding, position. This lever 87 has a cam slot 171, into which projects a roller 172, carried by a lever 173, pivoted at 174. The opposite arm 175 of the lever 173 has formed on one edge thereof a cam recess 176. A link 177, also pivoted at 174 and overlying the lever 173, has a complementary cam recess 178 formed in its edge, which cam recess cooperates with cam recess 176, formed in the arm 175 of the lever 173 to constitute a full cam slot. A spring 179, connected to a stud 180 on the arm 175, is also connected to a stud 181, carried by the link 177, to hold these two parts together, with the stud 181 in contact with the upper end of the arm 175. This arrangement provides a flexible cam mechanism, which will yield to prevent injury to the machine in case any of the parts are locked at the time the total lever 87 is shifted from its add position. A crank 185, fast on a shaft 186, carries a roller 187, entered in the cam slot formed by the complementary edges 176 and 178 of the arm 175 and the link 177.

When the total lever 87 is adjusted from its add position into its item total position, which is the first position below the add position, its cam slot 171 rocks the lever 173 counter-clockwise, and the arm 175, together with the link 177, rocks the crank 185 and the shaft 186 clockwise.

Initial movement of the lever 87, as is well known in machines of the type shown and described herein, causes the coupling together of a cam, to be described, with the previously-described gear 162, so as to control the restoration of the machine release shaft 70 to its normal position during total-taking and sub-total-taking operations. This mechanism will now be described. Mounted on the previously-described screw stud 163 (Fig. 16) and lying in a recess in the gear 162 is a cam 190, which cooperates with a roller 191, carried by a pitman 192, the lower end of which is pivotally connected to a lever 193, pivoted on the stud 167. The left end of the lever 193 is connected by a link 195 to an arm 194, which is fast on the previously-described shaft 186, which, it will be remembered, is moved by movement of the total lever out of its add position. The cam 190 is freely mounted on the stud 163 and is normally retained in an operated position by the roller 191 being in a notch 196, formed in the cam 190. The initial, clockwise, movement of the shaft 186, through the connections described above, causes the roller 191 to be withdrawn from the notch 196, and, at the same time, a coupling bar 197, which rides in a slot in the back of the cam 190, is moved to the left, as viewed in Fig. 16, by pins 198 on the pitman 192. These pins are on each side of a lip 199 on the coupling bar 197. This movement of the pitman 192 to the left is sufficient to move the narrow end 200 of the coupling bar 197 into a recess 201 in the gear 162, so as to couple the cam 190 to the gear 162, whereby the cam 190 will receive a rotation upon the rotation of the gear 162. The shifting of the pitman 192 by the cam 190 will, through a stud 203, which projects into a slot 204 in the previously-described link 154, rock the link 154 clockwise to position the vertical portion of the slot 169 beneath the pin 168 in the restoring arm 166, so that the release shaft 70 will not be returned to its normal position until the second cycle of the operation, all of which is old and well known in the art, as fully illustrated and described in the above-mentioned Shipley Patent No. 1,865,147.

*Motor bar lockout.*—As has been previously described, when taking a sub-total—that is, when the total lever 87 is moved into its first position above add position—the motor bar 86 is depressed to release the machine for operation.

However, when the total lever 87 is moved into its first position below the add position, which is the item total position, it is necessary to prevent any depression of the motor bar 86 while the total lever 87 is in said item total position, and, therefore, a lockout mechanism has been provided for the purpose mentioned above and will now be described.

Referring particularly to Figs. 14 and 15, there is pivotally connected to the total lever 87 the upper end of a link 210, the lower end of which is pivotally connected to an arm 211, which is secured to a shaft 212, supported by the machine side frames 92 and 93.

Also secured to the shaft 212 is an arm 213, having a slot 214, into which projects a pin 215, carried by a lever 216, pivotally mounted on a stud 217, supported in the frame 92.

As shown in Figs. 14 and 15, the parts are in their normal positions, with the total lever 87 in its central, or add, position.

Whenever the total lever 87 is moved down into the item total position, which, as above mentioned, is the first position below the add position, the link 210 rocks the arm 211 and the shaft 212 clockwise, whereupon the arm 213 is rocked likewise. During the rocking movement of the arm 213, the pin 215 is moved into a depressed portion 218 of the slot 214, thus rocking the lever 216 clockwise.

Pivoted to the lever 216 is the lower end of a link 220, the upper end of which is pivoted to an arm 221, in turn pivotally mounted on the lower pin 131, upon which the slide 130 slides.

The clockwise movement of the lever 216, described above, raises the link 220 and rocks the arm 221 clockwise to position a surface 222 thereof beneath a stud 223, carried by the slide 130, upon which the grocery motor bar 86 is mounted.

From the above description it can be seen that, whenever the total lever 87 is moved into its first position below the add position, the arm 221 is moved beneath the stud 223, thus preventing any inward movement of the slide 130 and the grocery motor bar 86, and therefore the grocery motor bar cannot be depressed when the total lever 87 is in the item total position.

*Automatic restoration of total lever from "item total" position to "add" position.*—After taking the final total of the items of a multiple-item transaction, plus the amount of the tax thereon, when any of the items are taxable, the total lever is automatically restored from the "item total" position (Fig. 1) to its "add" position. This mechanism is partially shown in Fig. 3 and will be but briefly described. For a full illustration and description of this mechanism, reference may be had to the United States Letters Patent issued to Frank B. Moser on January 13, 1953, No. 2,625,322.

The total lever 87 is provided with a rearwardly-projecting lug 241, adapted to be moved upwardly (Fig. 3) into the path of one of two rollers 242 when the total lever 87 is moved into its first position below its add position, which, as above mentioned, is the item total position. The rollers 242 are mounted within an annular groove 243 of a collar 244. This collar is rotated during total-taking operations for causing one of the rollers 242 to engage the lug 241 to restore the total lever 87 from its item total position to its add position.

The collar 244 is rotated by mechanism not shown herein but fully illustrated and described in the above-mentioned Moser Patent No. 2,625,322, which mechanism drives a shaft 248, to which is secured a gear segment 249, which meshes with a partial gear 250, loosely mounted on a shaft 251, upon which the collar 244 is mounted.

During the latter part of the first cycle of a total-taking operation, the segment 249 is rocked counter-clockwise and in turn rotates the partial gear 250 clockwise.

During this clockwise movement of the partial gear 250, the collar 244 is held against rotation by a flanged latch 266, which engages a shoulder 267 in one of the flanges of the collar 244. This latch 266 is pivoted on a rod 262 and is held in contact with the shoulder 267 by a spring 268. The gear 250 is permitted to rotate independently of the collar 244 due to a clutch connection (not shown in this application but shown in the above-mentioned Moser Patent No. 2,625,322).

This clutch mechanism causes a counter-clockwise rotation of the collar 244, and, during this counter-clockwise movement, one of the rollers 242 engages the lug 241 of the total lever 87 and restores the lever from its "item total" position to its "add" position.

Before the collar 244 can be rotated counter-clockwise, as just described, it is necessary to disengage a latch 253 from a wall 254 of a notch in the flange of the collar 244. This latch 253 is pivoted on the rod 262. Mounted on the segment 249 is a stud 260, which engages an arm 261 of the latch 253 near the end of the counter-clockwise movement of the segment 249, thereby rotating the latch against the tension of a spring 263. The arm 261 of the latch 253 is provided with a surface 264, long enough to maintain the latch 253 disengaged from the wall 254 of the notch in the flange of the collar 244, until the periphery of the flange of the collar 244 passes the nose of the latch 253. Just as the collar 244 completes its one half-rotation, the latch 253 will be engaged with the diametrically-opposite shoulder 265 of a notch in the flange of the collar 244, under the action of the spring 263, thereby preventing further rotation of the collar 244.

The timing of the restoration of the total lever 87 to its add position from its item total position is controlled, as fully illustrated and described in the above-mentioned Moser Patent No. 2,625,322, by the cycle control mechanism shown in that patent, shown in this application in Fig. 16, and including the timing pitman 192 and the lever 193.

*Automatic return of the total lever from its "sub-total" position to its "add" position.*—In order to avoid the necessity for the operator's having to restore the total lever from its "sub-total," or "read," position to its "add" position manually, after having taken a sub-total of several items of a multi-item transaction, to determine the amount of tax to be charged and also to determine the total amount of the sale prior to the customer's tendering the amount of the sale, a novel mechanism is provided for automatically restoring the total lever from the sub-total, or sub-read, position back into its add position.

In order to accomplish this, the mechanism used to automatically restore the total lever from its item total position to its add position, which has just been briefly described, is utilized in conjunction with the following-described mechanism. The following described mechanism is also fully illustrated and described in the above-mentioned Moser Patent No. 2,625,322 and therefore will be but briefly described herein.

Mounted on the shaft 248 (Fig. 3) is an arm 271, connected by a bail 272 to an arm 273, which also is mounted on the shaft 248. The arm 273 is notched to engage part of a machine frame 274 to hold the arm 273, the bail 272, and the arm 271 in a rigid position on the shaft 248.

Pivoted on a stud 275, carried by the arm 271, is a lever 276 carrying a pin 277, adapted to cooperate with the under side of the lug 241 on the rear of the total lever 87. Integral with the lever 276 is a finger 278, bent over to lie in the path of the rollers 242, which are carried, as above mentioned, between the flanges of the collar 244. A spring 279 holds the finger 278 normally adjacent one of the rollers 242, as shown in Fig. 3. The lever 276 is provided with a slot 280, which is concentric with the center of the stud 275. Projecting into the slot 280 is a pin 281, carried by the arm 271. The bottom edge of this slot 280 acts as a stop for the lever 276 against the action of its spring 279, so that it will remain in the normal position, shown in Fig. 3, and not bear against the roller 242. The description of how the lever 87 was returned to its normal position from the first position below the add position or, in other words, from its item total position described how one of the rollers 242, by its engagement with the upper side of the lug 241, restored the lever 87 to its add position.

During a sub-total operation, the segment 249 operates the partial gear 250 in exactly the same manner as it does during a total operation, which has been described above, and by the same mechanism. Consequently, the collar 244 and the rollers 242 operate in identically the same manner and at identically the same time during the sub-total operations, when the total lever 87 is moved to its first position above "add," which is the "sub-read," or "sub-total," position.

Therefore, during the last half of the second cycle of a sub-total operation—practically at the very end of said second cycle—the collar 244 is rotated counter-clockwise by the mechanism illustrated and described in the above-mentioned Moser Patent No. 2,625,322. When this occurs, one of the rollers 242, by its engagement with the finger 278 of the lever 276, rocks said lever clockwise, as viewed in Fig. 3, against the tension of the spring 279 a sufficient distance to cause the pin 277 to contact the under side of the lug 241 on the total lever 87 and rock said total lever counter-clockwise to its normal position, this being from the "sub-read," or "sub-total," position back into its "add" position after the completion of a sub-total-taking operation.

Therefore, by the means briefly described above, it is clear that the total lever 87 is automatically restored from the first position below add position back to add, and from the first position above add position back to add position.

*Amount differential mechanism.*—The amount differential mechanism shown in this case in connection with one single bank is substantially identical with the amount differential mechanism shown in the above-mentioned Shipley Patent No. 1,865,147, and therefore only a brief description thereof will be given herein.

Depression of any one of the amount keys 84 (Fig. 5) rocks the previously-described zero stop pawl 100 clockwise out of the path of a usual reset spider (not shown in connection with the amount bank but substantially identical with the forward end of the reset spider, shown in connection with the transaction bank, to be described hereinafter). This reset spider is freely mounted on the hub of an amount differential actuator 282, rotatably supported on a bushing 283, extending between two hangers or support plates 284 (only one of which is shown here), said plates being in turn supported in the usual manner by the rods 285, extending between the machine side frames 92 and 93. There is a pair of supporting plates 284 for each amount differential, and a tie rod 287 extends through the holes in the centers of the bushings 283, to secure all of the amount differentials in a compact unit.

A notch in the forward end of the above-mentioned reset spider engages a stud 288 in the forward extension of a bell crank 289, pivoted on an extension of the actuator 282. Carried by the vertical arm of the bell crank 289 is a stud 290, on which is pivoted an arm 291, which is also pivoted to the upper end of a latch 292, pivotally mounted on the actuator 282. The latch 292 has a foot 293, normally held in contact with the periphery of a driving segment 294, just above a shoulder 295 thereon, by means of a spring 296. The driving segment 294 is rotatably supported on the hub of the actuator 282. A link 297 pivotally connects the driving segment 294 to a cam lever 298, pivoted on a stud 299 in the left-hand one of the plates 284, said lever 298 carrying rollers 300 and 301, which coact with the peripheries of cams 302 and 303, respectively, secured to the main cam shaft 50. Depression of any one of the amount keys 84 moves its lower end into the path of a rounded surface 304 of the bell crank 289. In one-cycle, or adding, operations, the main cam shaft 50 and the cams 302 and 303 make one counter-clockwise rotation, as viewed in Fig. 5, causing the lever 298 to rock the driving segment 294 first counter-clockwise and then clockwise, back to normal position. Counter-clockwise movement of the segment 294 causes the shoulder 295, in cooperation with the foot 293 of the latch 292, to carry the latter and the amount actuator 282 counter-clockwise in unison until the rounded surface 304 contacts the stem of the depressed key 84. This causes a clockwise rocking of the bell crank 289, which, through the arm 291, disengages the foot 293 of the latch 292 from the shoulder 295 to arrest counter-clockwise movement of the actuator 282 to position said actuator according to the value of the amount key 84 which has been depressed.

This disengagement of the latch 292 moves the forward extension of the arm 291 into engagement with one of a series of locating notches 305 in a plate 306, which is mounted between the forward rod 285 and the upper extension of the left-hand supporting plate 284.

As the latch 292 is disengaged from the shoulder 295, an arcuate surface 307 on the segment 294 moves opposite the foot 293 to retain the latch and the corresponding differential mechanism in their set positions.

When the lever 298 reaches the terminus of its counter-clockwise movement, a roller 308, carried thereby, contacts an arcuate surface 309 on a beam 310, pivoted on a stud 311, carried by the actuator 282, and forces a concave surface on the upper edge of the beam into contact with the hub of the actuator 282 to move the rear end of the beam 310 into a position commensurate with the value of the depressed amount key 84.

The rear end of the beam 310 is bifurcated to receive a stud 321 on a link 322, the upper end of which is pivoted to a segment 323, secured to one of a series of nested sleeves 324, supported on a shaft 325, carried by the side frames 92 and 93. Each of the segments 323 is adapted to control indicating mechanism to select the proper indicators to indicate toward the front and back of the machine, to indicate the value of the key which has been depressed. This indicating mechanism will be described hereinafter.

The lower end of the link 322 is connected to an arm 326, secured to one of a series of nested sleeves 327, supported by the shaft 212. These arms 326 are used to set up and control printing mechanism to be described briefly hereinafter, which printing mechanism is substantially like that shown and described in the above-mentioned Shipley Patent No. 1,865,147.

From the above description it is very clear how the differential actuator 282 is set under control of the depressed one of the amount keys 84.

Each of the actuators 282 carries three sets of gear segments 330, 331, and 332, which cooperate with lines of totalizers to cause the values of the depressed amount keys to be accumulated into the selected one or more of the totalizers on these particular lines, in a manner which is old and well known in the art, and which is also fully illustrated and described in the above-mentioned Shipley patents.

The gear segment 330 actuates a totalizer on the upper line, and this totalizer is an add-subtract totalizer, or crossfooter, consisting of add pinions 333 and subtract pinions 334 (Fig. 25), to control additions into and subtractions from this, the itemizing totalizer. This item totalizer, or crossfooter, is carried by the usual type of sliding or shiftable frame 335 (Fig. 4). As has been previously stated, this itemizing totalizer is the only totalizer on the upper line. As has been stated above, all of the plus amounts are added into it, and all subtract amounts, such as refunds, are taken from it.

Also, the amount tendered is subtracted from the amount of the sale made to any particular customer. In other words, if the customer has purchased $3.50 worth of goods or produce and tenders the clerk $3.50, this amount, $3.50, will be subtracted from the amount of $3.50 in the crossfooter, and the crossfooter will be left at zero.

On the other hand, if the customer has purchased, say $3.50 worth of merchandise or produce and tenders the operator a five-dollar bill, the amount of $5.00 will be subtracted from the $3.50 in the crossfooter, leaving an overdraft of $1.50, which is the amount of change which the customer has coming to him and which will be indicated on the indicators, to be described hereinafter.

The gear segment 331 (Fig. 5) actuates totalizers 336 on the back totalizer line. These totalizers are carried by the usual sliding frame 337. The gear segment 332 actuates totalizers 338 on the front totalizer line. These totalizers 338 are carried by the usual sliding frame 339 (Fig. 9).

Whenever one of the pinions of the totalizers 336 or 338 on the back and front totalizer lines, respectively, or whenever one of the pinions 333 or 334 of the crossfooter on the upper line passes from "9" to "0," a transfer mechanism is tripped, causing "1" to be added upon the totalizer pinion of next higher denomination. Pivotally supported by the differential actuator 282, and associated with each of the gear segments 330, 331, and 332, is a transfer arm 340, there being three transfer arms altogether for each differential unit, each arm 340 having two teeth like the teeth of the differential gear segments 330, 331, and 332.

The transfer tripping mechanism associated with these three transfer arms 340 for the three totalizer lines is the same as that which has been fully illustrated and described in the United States Letters Patent No. 1,619,796, granted to Bernis M. Shipley on March 1, 1927, and reference may be had to that patent if a more detailed description of the transfer mechanism is desired.

The differential actuator 282 is restored from its differentially-set position each operation of the machine by a shoulder 341, on the driving segment 294, contacting a stud 342, carried by the differential actuator 282, when the driving segment 294 is moved clockwise to its home position, shown here in Fig. 5.

*Indicators.*—The indicating mechanism disclosed in connection with the present machine is substantially the same as that fully illustrated and described in United States Letters Patent No. 1,163,748, issued to Frederick L. Fuller on December 14, 1915. Therefore, but a brief description of it will be given herein.

There are two groups of indicators 345 (Fig. 5) for each of the amount banks of keys 84. One group of indicators is visible from the front of the machine, and the other group is visible from the back of the machine. There are likewise two groups of indicators associated with the transaction bank of keys 85. These indicators associated with the transaction keys are not shown, but they are identical, except for the indicia thereon, with the indicators shown in Fig. 5 as associated with the amount banks. Therefore, as all of these indicators are similarly mounted, the group associated with one of the amount banks only is illustrated and will be described.

The groups of indicators 345 are carried in a carriage 347 and rest upon ledges 348 of a runner 349 slidably mounted on rollers 350 on rods 351 supported by plates 352 secured to the machine frames 92 and 93 by screws 353. The runner 349 has teeth 354, meshing with the previously-described segment 323, which, it will be remembered, is differentially positioned through the beam 310 and the link 322 under control of the differential mechanism set by the amount key 84. In this manner, the carriage 347, carrying the groups of indicators 345, is differentially positioned to bring any desired indicator 345, one in the front group and one in the back group, into operative relationship with an indicator-lifting means to be described hereinafter.

As the indication from the back of the machine is the reverse of that seen from the front, all of the various groups of front and back indicators cannot be mounted on runners similar to the runner 349 but must be carried by separate runners, and the back indicators must be differentially positioned from the segment 323, which operates the front indicators, by the sleeves 324, which carry a second segment, similar to the segment 323, in mesh with a rack formed in the back indicator runner.

This is old and well known and has been fully illustrated and described in the above-mentioned Fuller Patent No. 1,163,748.

The indicator-lifting mechanism also is substantially the same as that shown and described in the above-mentioned Fuller Patent No. 1,163,748. After the indicator carriages 347 have been differentially positioned according to the keys depressed, the selected indicators are exposed to view by a lifter frame 357, having projections 358 at the front and back thereof and adapted to raise the selected indicators to view. Before the carriages 347 are differentially positioned, the indicators exposed during the previous operation are lowered to their normal positions by the frames 357. The raised indicators are exposed to view so that the indicia thereon may be read by the customer and by the clerk through openings 355 in the front and back of the cabinet or casing 114.

Each of the previously-described segments 323 has alining notches 359, with which cooperate the usual aliners 360, integral with parallel arms 361, secured to a shaft 362.

This shaft 362 is rocked counter-clockwise (Fig. 5) to disengage the aliner 360 from the segments 323 prior to the differential positioning of the segments, and then, after they have been positioned, the shaft 362 is rocked clockwise to cause the aliner 360 to engage the notches 359 to aline the segments 323 in their differentially-set positions.

There is also another alining mechanism, which directly alines the runners 349 of the indicator carriage 347. This aliner 363 is in the form of an angle iron. In alinement with each runner 349, the aliner 363 has a slot which guides the runners in their movements, and also an aliner tooth 364, which cooperates with teeth 365, formed in the runner 349. The aliner 363 is secured at each end to the horizontal portion of an arm 366, pivoted on studs 367, mounted in the plates 352. Pivoted to the arms 366 are links 368, which are pivoted to arms (not shown) secured to the shaft 362, which, as has been previously described, is rocked to operate the aliner 360, and therefore, simultaneously with the movement of the aliner 360, the aliners 364 and 363 are operated to control and aline the indicator carriages 347.

*Transaction differential.*—Associated with the transaction keys 85 (Figs. 1 and 7) is a differential mechanism including a differential arm 394, pivoted at 393 and carrying a bell crank 395, to the upper arm of which is pivoted an arm 396, which is also pivoted to a latch 397, pivoted on the differential arm 394. The latch 397 has a foot 398, normally resting above a shoulder 399 on a driver 400. A spring 401 holds the latch foot 398 normally in engagement with the driver 400. The driver 400 receives a clockwise movement and then a counter-clockwise movement to normal position by means of a link 402, connected to and driven by a lever 403, pivoted at 404 to one of the differential plates 284. The lever 403 carries a pair of rollers 405 and 406, cooperating with and driven by a pair of cam plates 407 and 408, respectively.

As the driver 400 is moved clockwise, the differential arm 394, through the latch 397, is carried upwardly until the forward end 409 of the bell crank 395 strikes the inner end of one of the depressed transaction keys 85, at which time the continued movement of the driver 400 causes the latch 397 to be withdrawn from the shoulder 399, whereupon the forward end 409 of the arm 396 engages the appropriate one of a series of notches 410 in a stationary plate 411, associated with the transaction bank of keys 85.

Pivoted at 412 on the differential arm 394 is the usual beam 413, which is contacted by a roller 414 on the driving lever 403, to position the free end of the beam in accordance with the differential setting of the arm 394.

This beam 413 is slotted as usual to engage a stud 415 of a link 416, the upper end of which is connected to a segment 417, secured to the inner one of the nested sleeves 324, for the purpose of setting the proper indicator according to the key depressed. This segment 417 meshes with the teeth 418 on an indicator runner or actuator 419, similar to the indicator runner 349, described in connection with the amount banks in Fig. 5.

Since the indicators associated with the transaction keys are similar to or, in fact, substantially identical with those associated with the amount banks, with the exception of the indicia thereon, no further description of the actuation of the transaction indicators is thought necessary herein.

It might be well to state that the indicators 345 associated with the transaction bank are marked as follows to indicate to the front and back of the machine: One indicator carries the word "Meat," and then each successive indicator carries the following indicia thereon: "Produce," "Miscellanous," "Tax," "No Change," "Amount Tendered," "Refund," and "Change."

The lower end of the link 416 is connected to an arm 420, which is secured to a sleeve 421, mounted on the shaft 212. This sleeve 421 also has secured thereto a segmental gear 423, which is for the purpose of setting up type wheels to print, on the check and detail strip, characters representing the keys 85 which have been depressed, and also characters representing the Grocery bar 86.

Figure 26:
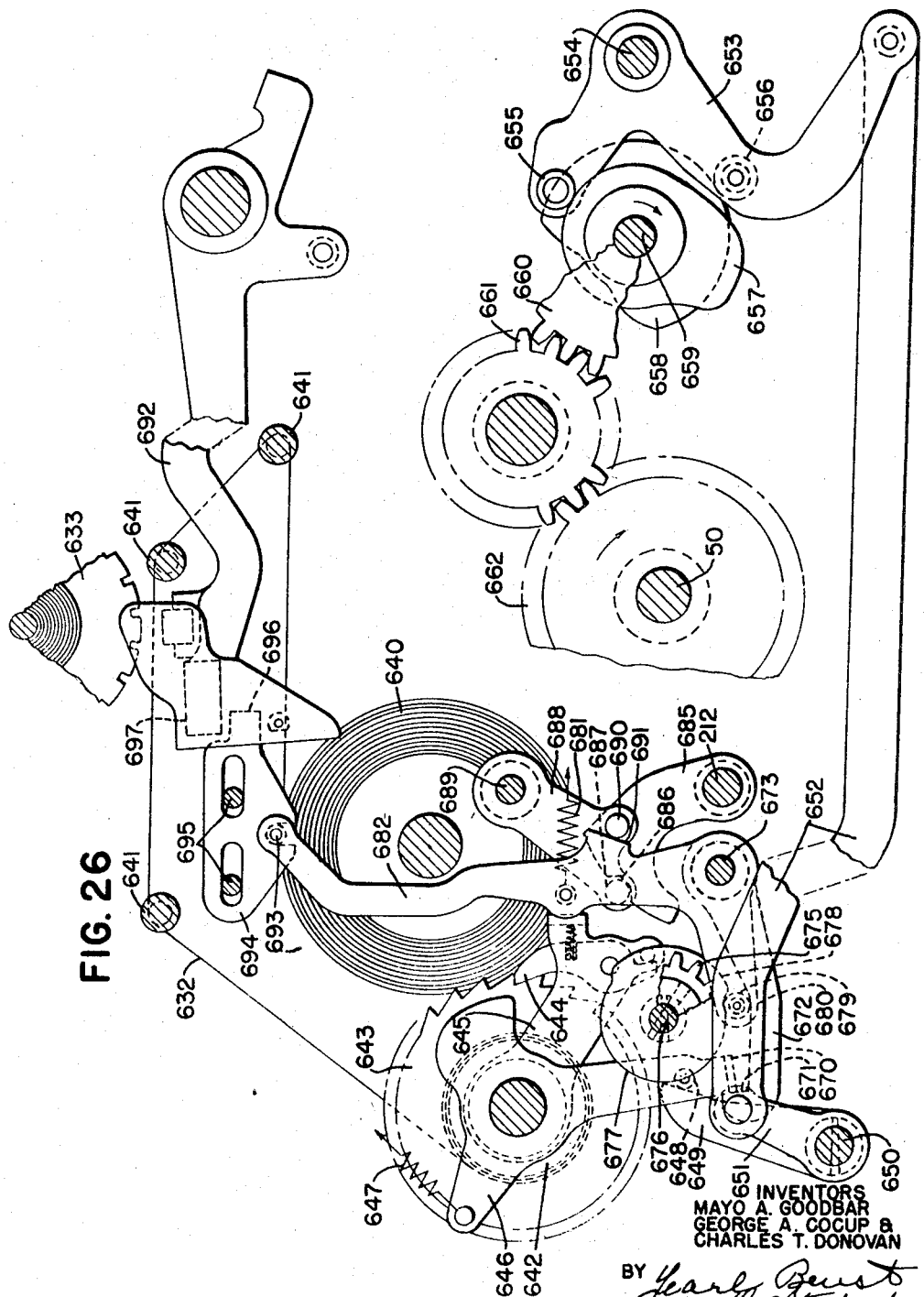
Fig. 26 shows in enlarged scale the means for printing and feeding the sales journal strip.

The connection between the segment 423 and the type wheels 424, a portion of which are shown in Fig. 26, is fully illustrated and described in the above-mentioned Shipley Patent No. 1,865,147 and will not be described herein in detail.

The previously-described aliner 360, which was described in connection with the amount differential mechanism and the amount indicators, also alines the indicator-driving segment 417, shown in Fig. 7.

The beam 413, the link 416, and the arm 420 also, by means to be described hereinafter, operate a totalizer-shifting mechanism to select the proper one of a group of totalizers on the front totalizer line according to the keys in the transaction bank which have been depressed.

In other words, each of the transaction keys 85 designated "Meat," "Produce," "Miscellaneous," "Tax," and "Refund" selects one of the totalizers 338 on the front line of totalizers to have accumulated therein the amounts corresponding to the amount keys which are depressed in connection with the transaction key 85.

On this front line is also another totalizer 338, into which are accumulated all of the amounts relating to groceries, and this totalizer is selected whenever the Groceries motor bar 86 is depressed during an adding operation.

The means for causing the selection of this particular totalizer 338 in the front line under control of the Groceries motor bar 86 will now be described. Since the usual zero stop mechanism in connection with the transaction keys 85 is not present in this machine, as shown in Fig. 7, whenever the Groceries motor bar 86 is depressed in an adding operation to release the machine in the previously-described manner, the transaction differential mechanism shown in Fig. 7 goes to the limit of its upward movement, which is the "9" position, thus causing the beam 413 to move the link 416 a corresponding distance, which is sufficient to select the totalizer 338 in the "9" position, this being the "Groceries" totalizer.

The connection for shifting the front totalizer frame 339 is shown partially in Fig. 9. Secured to the sleeve 421, which, it will be remembered, is operated by the beam 413 and the link 416, as just described, is a segment gear 424, which meshes with a rack 425, secured to a slidable bar 426, supported by screw studs 427 (only one of which is shown in Fig. 9). The bar 426 has a right-angled flange 428, having therein the usual cam slot to give a lateral movement to a totalizer-shifting bar 429, which is engaged by the totalizer frame 339 in a manner fully illustrated and described in the above-mentioned Shipley Patent No. 1,865,147.

As has been previously stated, there is associated with the transaction keys designated "Meat," "Miscellaneous," "Produce," "Tax," and "Refund" a totalizer 338, which is mounted in the totalizer-shifting frame 339, as shown in Fig. 9. Therefore, whenever the transaction differential mechanism of Fig. 7 is set under the control of any of these keys which have been depressed, the segment gear 424 is differentially adjusted accordingly to operate the bar 426 to cause the lateral shifting of the totalizer frame 339 to select the appropriate totalizer 338.

Since all this is old and is fully illustrated and described in the above-mentioned Shipley Patent No. 1,865,147, it is not thought necessary to go into any further description of this totalizer-selecting mechanism.

Also, since the totalizer engaging and disengaging mechanism—that is, the mechanism which engages and disengages the pinions and the differential actuators—is old, that mechanism is not shown herein, and reference may be had to the Shipley Patent No. 1,619,796, previously mentioned.

There is no totalizer associated with the No-Change key, the Amount Tendered key, or the Change key 85 in the transaction bank.

As has been mentioned above, there is an add-subtract totalizer, or crossfooter, having add pinions 333 and subtract pinions 334 (Fig. 25), and this totalizer is on the upper totalizer line. Means for shifting this totalizer frame, which is shown in Fig. 4 and designated 335, so as to select either the add pinions 333 or the subtract pinions 334 under the control of the transaction differential mechanism, will now be described.

The crossfooter totalizer frame 335 has a pin 441, projecting into a hole in a totalizer-shifting arm 442, pivoted on a stud 443, carried by a bracket 444, supported by bars 445, in turn supported by the side frames 92 and 93. The shifting arm 442 pivots around the stud 443 to shift the totalizer frame 335 from the add position to the subtract position and vice versa, depending upon which ones of the keys 85 or motor bar has been depressed.

The shifting arm 442 carries a roller 446, projecting into a cam race 447 of a partial drum cam 448. This cam race is shown in Figs. 4 and 25. The partial drum cam 448 is secured to the previously-described sleeve 324, which, it will be recalled, is fastened to the segment gear 417 (Fig. 7), operated by and under control of the keys 85 of the transaction bank.

The cam race 447, as viewed in Fig. 25, is so shaped that, when the differential mechanism associated with the transaction keys is stopped in the 0, 1, or 2 position, the subtract pinion 334 is in line with the differential actuators 330, and, when the cam 448 is moved under control of the keys from the fourth position to the eighth position, respectively, and under control of the motor bar 86, the plus pinion 333 is in line with the differential actuator 330. As shown in Fig. 25, the 4 position is the no-change position, the 3 position is the amount tendered position, the 2 position is the refund position, and the 1 position is the change position. Therefore, when the Refund key is depressed, the subtract side, or, in other words, the pinion 334 of the add-subtract totalizer, is operable by the differential actuator, as shown in Fig. 25. Also, when the Change key is depressed, the totalizer is shifted to have the subtract pinion in line with the actuator 330.

When the differential mechanism is stopped in the zero position by means to be described hereinafter, whenever the Amount Tendered key is pressed, the totalizer-shifting cam 448 is set in the subtract position.

Secured to the cam 448 is an alining segment 449 (Fig. 4), which is engaged by the previously-described aliner 360, to positively and accurately aline the drum cam 448 in the position into which it has been set under control of the transaction keys.

The left end of the shifting arm 442 has two fingers 450 (only one of which is shown), which project into slots in brackets 451 (only one of which is shown) to support and guide the left end of the shifting arm 442.

*Total lever control of transaction differential.*—Pivoted on the center 393 (Figs. 7 and 20) is an arm 455, which has in its outer end a slot engaging a pin 456, carried by the previously-described bell crank 395 of the transaction differential. It will be recalled that this is carried by the differential arm 394 and is connected to the differential latch 397 by the arm 396. Integral with the arm 455 is a segmental arm 457, having a shoulder 458, adapted to cooperate with a finger 459, carried by an arm 460, pivoted at 461 and normally held in contact with a pin 462, carried by the total lever 87, by a spring 463. As shown in Figs. 7 and 20, the pin 462 and the total lever 87 are in adding position.

Since the arm 455 is connected to the differential arm 394 through the pin 456, it is clear that whatever movement is imparted to the differential arm 394 under control of the keys 85 is also imparted to the arm 455 and its integral segmental arm 457.

However, when the total lever 87 is moved to the item total position, which is the first position below add, the pin 462 is moved opposite a notch 465 of the arm 460, whereupon the spring 463 rocks the arm 460 counter-clockwise and positions the finger 459 in the path of the shoulder 458 on the segmental arm 457, which shoulder 458 corresponds to the fourth position.

Therefore, the differential latch 397 will be disengaged from the driver 400, and consequently the differential arm 394 is stopped in the fourth position, thus positioning the beam 413 and the link 416 in the fourth position. Thus, the indicating mechanism and the printing mechanisms are properly set to indicate that an item total was made at this time.

Also, this particular setting of the differential in the fourth position shifted the drum cam 448 to the fourth position, which selected the plus side of the add-subtract totalizer or crossfooter. In other words, it places the add pinion 333 in alinement with the differential actuator 330.

Whenever the total lever 87 is moved into the first position above add, which is the sub-total position, then the pin 462 on the total lever 87 is opposite the notch 466 of the arm 460, and the spring 463 then moves the finger 459 into cooperative position with the shoulder 458. The differential arm 455 is therefore stopped in the fourth position, whereupon the beam 413 and the link 416 control the indicators and the printing mechanism to indicate that a sub-total was taken at this particular time, and it also causes the setting of the drum cam 448 to select the plus side of the crossfooter. Should there be no plus amount in the crossfooter at this time, which condition could have been caused by a refund greater than the amount of the purchase, then only the Change key could be depressed, because the No-Change key is locked at this time. As previously stated, the Change key selects the minus side of the crossfooter by causing the transaction differential to stop in the number one position.

*Totalizers.*—The front line of totalizers 338 and the back line of totalizers 336 have been discussed previously. The upper totalizer line, as above mentioned, carries the crossfooter, which consists of add pinions 333 and subtract pinions 334. This totalizer is an itemizing totalizer only; into it are added all of the cash items, and from it are subtracted all of the refund items and also the amount of money tendered by the customer when he pays for his groceries.

The means for shifting the add-subtract totalizer from the plus side to the minus side, and vice versa, has already been described, and no further description need be given here.

The means for shifting the front and back lines of totalizers to select various totalizers thereon has been briefly described, and, as that mechanism is fully illustrated and described in the above-mentioned Shipley Patent No. 1,865,147, no further description of that mechanism will be given herein. Also the means for engaging the totalizers with and disengaging them from the actuators 330, 331, and 332 is old and fully illustrated and described in the last-mentioned Shipley patent.

*Overdraft mechanism per se.*—As has been previously stated, whenever a refund is made which is greater than the amount of money which has been added onto the plus side of the totalizer, an overdraft is created in the crossfooter. Also, whenever the amount tendered is greater than the amount of the purchase, and this amount tendered is entered into the machine, it is added to the minus side of the totalizer and therefore creates an overdraft in the crossfooter. This overdraft mechanism per se will now be described.

Secured to the side of the highest order pinion 333 (Figs. 23 and 25) on the plus side of the crossfooter or add-subtract totalizer is a disk 482, having a node 483 on its periphery.

In subtracting operations, the crossfooter is shifted into the position shown in Fig. 25, where the minus pinion 334 may be engaged with the amount differential actuator 330 and rotated clockwise, which imparts a counter-clockwise movement to the pinion 333 to rotate the latter reversely, so that the highest order plus wheel passes from 0 to 9 when an overdraft occurs.

When the plus wheel 333 passes from 0 to 9 in an overdraft, the disk 482 will be rotated counter-clockwise, whereupon the node 483 will coact with a projection 481 on an arm 487 to rock the latter clockwise.

The arm 487 is secured by a hub 486 to a second arm 485, both of said arms and the hub being supported on a rod 488 (Fig. 23), carried at one end by a hanger plate 284 for the highest order and at its other end by a bracket 489, also secured to the hanger plate 284. Carried by the arms 485 and 487 is a rod 490, embraced by an arm 491, secured to a shaft 492, suitably journaled in the left-hand machine frame 93 and the highest amount hanger plate 284. It will thus be seen that both arms 485 and 487 will be rocked clockwise as a single unit, at which time the rod 490, coacting with the arm 491, will rock the latter and the shaft 492 clockwise (Fig. 23).

To aline the arms 485 and 487, a plunger 503 is slidably mounted in a lug 504 on the bracket 489. The upper end of the plunger 503 has a notched head, which engages a stud 505, carried by the arm 485. A spring 506, wound around the plunger 503 and compressed between the lug 504 and the head on the plunger, constantly maintains the latter in engagement with the stud 505. When the arms 485 and 487 are rocked clockwise, as above mentioned, the plunger 503 will rock counter-clockwise about its support a distance commensurate with the full extent of clockwise movement imparted to said arms, in which moved position the plunger 503 will retain said arms until the overdraft is removed from the crossfooter.

When the overdraft is removed from the crossfooter, the crossfooter is again shifted toward the left, if not already in that position, in an old and well-known manner, so as to engage the minus side of the totalizer (namely, the pinion 334) when the crossfooter is moved into engagement with the amount differential actuators 330. Such shifting of the crossfooter will again position the disk 482 so that the node 483 thereon will be opposite the projection 481 on the arm 487. After the crossfooter has been moved into engagement with the amount differential actuators 330, and the minus pinion 334 is moved counter-clockwise thereby, the disk 482 will be moved clockwise therewith, and, since at this time the projection 481 on the arm 487 is in its clockwise (Fig. 23), or overdrawn, position, the node 483 on the disk 482 cannot strike the projection 481.

During the change computation operation, the minus pinions 334 are always set to zero, and the plus pinions 333 are all set to 9. During the first adding operation following a change computation operation, the totalizer wheels are shifted back to the right, where the node 483 of the disk 482 is alined with the projection 481 and the arm 485. During this first adding operation following a change computation operation, which is a negative balance operation, the highest order wheel 333 passes from 9 to 0 by reason of the tens transfer mechanism being tripped across the totalizer. When this highest order pinion 333 passes from 9 to 0, the node 483 engages the projection 484 to rock the arms 485 and 487 counter-clockwise back to the position shown in Fig. 23, and, through the rod 490, impart a like movement to the arm 491 and the overdraft shaft 492.

Now, when the crossfooter wheel 333 is engaged with the actuator 330, the node 483 of the disk 482 is in position to engage the projection 484 of the arm 485, and, when the totalizer wheel passes from 9 to 0, at which time the totalizer changes from the overdrawn condition to the positive condition, this engagement rotates the arm 485 counter-clockwise, back to the position shown in Fig. 23. As the arm 485 moves back into such position, the arm 491 and the shaft 492 are rocked counter-clockwise, back to their normal positions.

The usual and well-known "fugitive 1" mechanism is operated by the shaft 492, when rocked by the disk 483, in the manner shown and described in the above-mentioned Goldberg Patent No. 2,175,346, or in the Shipley Patent No. 1,791,907, so that the true negative balances may be printed. This mechanism will be briefly described.

As mentioned above, when an overdraft occurs in the crossfooter, the shaft 492 (Figs. 21 and 22) is rocked clockwise. Secured to the shaft 492 is a forked arm 510, engaging a pin 511, carried by a forked arm 512, pivoted on a rod 513, supported by the machine frames.

The forked arm 512 engages a pin 514, carried by an arm 515, which is pivoted on the shaft 492. This arm 515 carries a pin 516, projecting into a slot 517 of a link 518, pivoted at 519 to an arm 520, secured to a short shaft 521. On the end of the shaft 492 is a roller 522, which cooperates with a surface 523 of the link 518 in a manner now to be described.

Whenever the shaft 492 is rocked clockwise, as described above, when an overdraft occurs, the arm 510 rocks the arm 512 counter-clockwise, and this arm, through its engagement with the pin 514, rocks the arm 515 clockwise, as viewed in Fig. 21, whereupon the pin 516 rocks the link 518 counter-clockwise about its pivot point 519, during which time the surface 523 of the link 518 engages the roller 522, and, upon continued clockwise movement of the arm 515, the pin, still moving the link 518 counter-clockwise, causes the link to become a toggle and force the arm 520, to which it is attached, and the shaft 521 to be rocked counter-clockwise, as viewed in Fig. 21.

On the other end of this shaft 521, in association with the tens transfer mechanism connected with the units, or lowest, order bank, is an arm 530, which carries the usual flat pin 531 (Fig. 24) in engagement with a shoulder 532 of a transfer trip pawl 533, which is normally in the position shown in Fig. 24, whereupon its end is in front of a square stud 534 on the transfer segment 340, which is normally urged counter-clockwise by the usual spring 535.

From the above description it will be clear that, whenever the shaft 521 is rocked counter-clockwise (Fig. 21), upon the occurrence of an overdraft in the crossfooter, the arm 530 is rocked counter-clockwise and moves the flat stud 531 off from the shoulder 532, whereupon the usual coil spring (not shown) rocks the transfer trip arm 533 clockwise about its pivot 536, thus moving the right end of the trip pawl 533 from in front of the stud 534, whereupon the spring 535 rocks the transfer trip arm 340 counter-clockwise until the square stud is engaged by the usual shoulder 537, thus turning the pinion 333 one step, which is sufficient to cause "1" to be added into the units order, or lowest denomination, of the crossfooter, in order to correct the totalizer, so that, when the amount is printed, it will be the correct amount of the overdraft.

*Machine released locked by overdraft.*—Whenever an overdraft occurs in the crossfooter, whether it be due to an amount tendered which has been entered, or whether it be due to the fact that a refund greater than the amount on the totalizer has been entered, mechanism is operated to prevent operation of the machine release shaft 70.

The mechanism for causing this locking of the machine release shaft 70 will now be described, with particular reference to Fig. 20.

The shaft 70 is not actually locked each time the overdraft occurs, but a condition is set up so that, when an overdraft is in the crossfooter, when the total lever 87 is moved either one step up to its sub-total position or one step down to its item total position, then the mechanism which has been set by the occurrence of the overdraft is released to prevent the clockwise movement of the shaft 70 and consequently the release of the machine by the depression of any of the keys 85, with the exception of the Change key.

Integral with the previously-described arm 515 is a hook 541, normally engaging a pin 542 (Fig. 20) carried by a lever 543, pivoted at 544. This lever has a finger 545, normally held against a pin 546, in the previously-described lever 460, by a spring 547.

Pivoted to the above-mentioned stud 542 is a link 550, which in turn is pivoted to an arm 551, pivoted on the shaft 140. A bail 552 connects the arm 551 to an arm 553, which carries a pin 554, projecting into a slot in an arm 555, which has a finger 556, adapted to be moved in front of an arm 557, which is secured to the machine release shaft 70.

From the above it can be seen that, whenever the hook 541 is disengaged from the pin 542, the spring 547 rocks the lever 543 counter-clockwise (assuming first that the total lever has been moved out of add position so as to move the stud 546 away from the finger 545 on the lever 543) thus causing the link 550 to rock the arm 551, the bail 552, and the arm 553 counter-clockwise, whereupon the stud 554 rocks the arm 555 and positions the finger 556 in front of the arm 557 on the machine release shaft 70, thus locking this shaft against operation whenever there is an overdraft in the crossfooter, when the total lever is out of add position, either in sub-total position or in its item total position.

In Fig. 20, the parts are shown in their normal positions. The arm 553 also has a pin 560, engaged by a hook on the upper end of a slidable bar 570, mounted on pins 571, carried by the transaction key frame 104. The bar 570 has a lug 572, normally underneath the pin 115 of the Change key 85, and a lug 573, which is normally above the pin 115 on the No-Change key 85.

When the overdraft locking mechanism of Fig. 20 is released by movement of the total lever, whenever an overdraft is in the crossfooter, the spring 547, when it rocks the arms 551 and 553, causes the pin 560 to lower the sliding bar 570, position the lug 571 directly beneath the pin 115 of the No-Change key 85, and at the same time position the slot 574 in the bar 570 beneath the pin 115 of the Change key.

With the parts in this position, the Change key 85 may be depressed to release the machine, and, when such depression of the Change key occurs, the pin 115 thereon, by its contact with the upper wall of the slot 574, raises the bar 570 and rocks the arm 553 clockwise, whereupon the arm 555 is rocked likewise to move the finger 556 away from the arm 557 on the machine release shaft 70. Therefore the machine may be released upon depression of the Change key whenever there is an overdraft in the crossfooter and the total lever is either in its sub-total position or in its item total position.

If there is no overdraft in the machine, it is clear that the lug 572 prevents any depression of the Change key.

*Interlock between the Change key and the No-Change key.*—In Fig. 12 is shown the previously-described locking bar 117, with its locking lugs 116, two of which are positioned directly beneath the pins 115 of the Change and No-Change keys 85 of the transaction bank when the total lever is in its add position, thus positively preventing a depression or operation of either of said keys when the total lever 87 is so set.

When the total lever 87 is moved into either its sub-total position or its item total position, mechanism is operated thereby to move the interlocking bar 117 upwardly one step from the position shown in Fig. 12 to unlock the Change and No-Change keys 85 and lock out all other keys 85 of the transaction bank.

This mechanism will now be described. Secured to the total lever 87 is a plate 575, having a cam race 576, into which projects a pin 577 of a bell crank 578, pivoted on the rod 285. The bell crank 578 also carries a pin 579, projecting into a bayonet slot 580 of a bell crank, 581, pivoted on a shaft 582. The bell crank 581 also carries a pin 583, engaged by a hook 584 on the lower end of the interlocking bar 517.

By referring to Fig. 12, it can be seen that, whenever the total lever 87 is moved either up or down, the cam plate 575, through its slot 576, will rock the bell crank 578 counter-clockwise, thus rocking the bell crank 581 clockwise a distance sufficient to remove the lugs 116 from beneath the Change and No-Change keys 87 and position all of the other lugs above the Change key underneath the pins on the Refund key, the Amount Tendered key, the Tax key, the Miscellaneous key, the Produce key, and the Meat key, thus preventing the depression of any of these keys while the total lever is out of its add position.

Thus, it can be seen that, whenever the total lever is in either the sub-total position or the item total position, only the Change key 85 and the No-Change key 85 are operable, and, of these two keys, only the Change key is operable whenever the amount in the add-subtract totalizer is negative, and the No-Change key is operable whenever the amount in said totalizer is positive. This is controlled by the control bar 570 in Fig. 20, as described above.

*Controls by the Amount Tendered key.*—The Amount Tendered key 85 also controls certain operations of the machine. Whenever the Amount Tendered key 85 is depressed, the differential mechanism (Fig. 7) associated with the transaction bank is stopped in its zero position to select the minus side of the crossfooter because, as above mentioned, whenever an amount tendered is entered into the machine, it is put into the minus side of the totalizer, so that, if said amount tendered is the same as the amount of the sale, this amount will be subtracted from the amount of the sale, and the totalizer will be left at zero. However, if the amount tendered is greater than the amount of the sale, it creates an overdraft in the machine, and then the machine can be released only upon depression of the Change key 85 when the total lever is in its item total position, during which operation the machine will indicate the amount of change coming to the customer, which amount of change is the amount of the overdraft, or the difference between the amount tendered and the amount of the sale.

Referring to Fig. 9, the pin 115 in the Amount Tendered key 85 is normally in contact with a cam lug 590 on a slide 591, supported on pins 592, carried by the key bank 90 associated with the lowest order of amount keys.

The lower end of the slide 591 is forked to engage a pin 593, carried by a special zero stop lever 594, which is pivoted on the rod 285.

A spring 595, attached to the slide 591, holds the slide 591 up in the position shown in Fig. 9, thus retaining the zero stop lever 594 out of the path of movement of the end of the arm 455, which is connected to the transaction differential latch.

As has been previously stated, it is impossible to depress the Amount Tendered key 85 until after the entry of at least one plus item is made in the crossfooter and a sub-total operation following this add operation, or following a plurality of successive operations which leave the crossfooter in a plus condition. This mechanism is shown in Fig. 9 and will now be described.

It has just been described how the depression of the Amount Tendered key 85, through its pin 115, moves the slide 591 downwardly and rocks the special zero stop lever 594 clockwise to position it in the path of the forward end of the arm 455 in connection with the transaction differential to cause the differential mechanism to be stopped in the zero position to select the minus side of the crossfooter. However, as shown in Fig. 9, this movement of the lever 594 is normally prevented by a stud 600 on the zero stop lever 594 contacting a surface 601 of a slide 602, pivoted to a bell crank 603, pivoted at 604 on the machine side frame. The slide 602 is guided in its movements by a pin 599 on the machine frame. The bell crank 603 is retained in its normal position by a spring 605. Pivoted to the bell crank 603 is a pitman 606 surrounding the main cam shaft 50 and carrying a roller 607, which cooperates with a plate cam 608, secured to the main drive shaft 50.

During each cycle of the machine, the shaft 50, as previously mentioned, is given one complete clockwise rotation, as viewed in Fig. 9. During the rotation, the first thing that happens, due to the cam 608, is the movement of the pitman 606 to the right to rock the bell crank 603 counter-clockwise, raise the link 602, and remove the surface 601 from the rear side of the pin 600 in the special zero stop lever 594. In an adding operation, the link 602 is returned to its normal position by the spring 605. However, during a sub-total operation, it will be recalled, the transaction differential is stopped in the "4" position by the automatic mechanism including the arm 455, the arm 457, and the stop 459 (Figs. 7 and 20); therefore, this differential movement of the transaction differential to the fourth position moves the previously-described slide 426 (Fig. 9) to the fourth position. Secured to the side of this slide is a bar 609, having a lug 610 in the position corresponding to the fourth position of movement of the slide 426. Consequently, when the bell crank 603 is rocked counter-clockwise during the sub-total operation, a screw stud 611 thereon is raised a like amount, and, when the differential slide 426 stops in the fourth position, the lug 610 is then beneath the screw stud 611 and prevents any return movement of the bell crank 603 and the link 602 by the spring 605, thus holding the surface 601 up away from the rear side of the stud 600 in the special zero stop lever 594; consequently it can be moved clockwise upon the depression of the Amount Tendered key 85 after a sub-total operation, when there is a positive amount in the crossfooter. The spring 605 holds the stud 611 in contact with the bar 609 or the top of the lug 610.

There is, however, another lock, which prevents the special zero stop lever 594 from being moved clockwise until after the entry of a plus item or a series of items which leave the crossfooter in a plus condition prior to the taking of the sub-total, and this mechanism includes a latch 612, pivoted on a shaft 613, supported by the machine frames 92 and 93.

Secured to the latch 612 is an arm 614.

The latch 612 carries a pin 615, against which is held a finger 616 of an arm 617 by a torsion spring 618, one end of which engages the pin 615 on the latch 612, the other end of said spring 618 being engaged with a pin 619 on the arm 617. The arm 617 is pivoted on the shaft 613.

This spring forms the usual flexible connection between the latch 612 and the arm 617.

The latch is held against the pin 456 of the differential latch by a torsion spring 620, one end of which engages a pin 621 on the arm 617, the other end of said spring being engaged with a radial pin 622 in the shaft 613. This spring rocks the latch 612 and the arm 614 counter-clockwise when the pin 456 is moved upwardly by the transaction differential mechanism.

The pin 456 is in the position that it takes after the taking of an item total. Thus the latch 612, which is contacted by the pin 456, is held in the locking position, as shown in Fig. 9, thus preventing any movement of the zero stop lever 594.

However, upon the entry of an item into the plus side of the crossfooter, the differential arm is rocked clockwise, as has been previously described, and the pin 456 is therefore moved upwardly to release the arm 614 to the influence of the spring 620. This movement of the pin 456 is sufficient to put it above the latch 612, and therefore the special zero stop lever 594 is released, so that it may be operated upon depression of the Amount Tendered key 85.

Therefore, since both the latch 612 and the slide 602 are moved from behind the pin 600, the operator may enter the amount tendered into the machine and release the machine by the depression of the Amount Tendered key 85.

The upper end of the arm 614 carries a roller 623, projecting into a slot 624 in an arm 625, pivotally supported on a stud 626, carried by the right-hand hanger plate 284. As the arm 614 is rocked counter-clockwise under the influence of its spring 620, in the manner described above, the pin 623, through its engagement with the slot 624, rocks the arm 625 clockwise, thus moving a flattened pin 627 above a shoulder 628 in the previously-described cam plate 575, which is secured to the total lever 87.

Now, when the total lever 87 is moved upwardly into its sub-total position, the shoulder 628 causes the arm 625 to slide upwardly on the pin 626, there being a slot 629 provided for this purpose, thus moving a finger 630 behind the pin 623, thus preventing any clockwise movement of the arm 614 while the total lever 87 is in the sub-total position.

When the total lever 87 is restored to its normal, add, position, the arm 625, due to gravity, slides down on the pin 626, and, when the arm 614 is moved back into the poistion shown in Fig. 9, the pin 627 is disengaged from the shoulder 628 of the cam plate 575.

*Printer*

As above mentioned, the machine embodying the present invention is adapted to print on an issuing check or receipt and on a journal strip or detail record.

Fig. 10 shows a receipt or check 634 illustrating one type of transaction which was printed by the machine.

Fig. 11 shows an itemized check 631, illustrating another type of transaction which was printed by the machine, and Fig. 13 shows a portion of the journal strip 632 or detail record printed by the machine. As has been previously stated, on the receipt or check are printed all of the items, all amounts of taxes, all sub-totals, all paid-out operations, all amount tendered amounts, the amounts of any refunds, and the amount of change if the customer has change coming, and, if the customer has no change coming, then the machine prints all zeros. On the detail strip 632 are printed only the amounts of refunds, the amount of change, the amount of money tendered by the customer, and the amount of all sub-totals and all totals, and, when the customer has no change coming, the machine prints 0.00, with the proper designations.

The check in Fig. 10 shows that the customer purchased $3.00 worth of meat, 20 cents' worth of produce, and 20 cents' worth of groceries and that this amounted to $3.40. The operator made a sub-total and printed $3.40, which was printed not only on the check 634 but on the detail strip in the bottom item in Fig. 13. A refund of 10 cents was then made to this customer, was printed on the check in Fig. 10, and also was printed on the detail strip in the next-to-last item in Fig. 13.

A second sub-total was taken, which showed $3.30, which amount was printed on the check 634 and also printed on the detail strip as the third item from the bottom in Fig. 13. The customer then presented the clerk with exactly $3.30, the amount of of the sale, and this amount, $3.30, designated as AT—Amount Tendered—is printed on the receipt 634 and is also printed on the detail strip 632 as the fourth item from the bottom in Fig. 13. Then the operator moved the total lever 87 to the item total position, and, since the Change key 85 was locked, the operator depressed the No-Change key 85, and the amount of 0.00 is printed on the check 634 and also on the detail strip 632 as the fifth item from the bottom in Fig. 13. It is noted that none of the items Meat, Produce, or Groceries was printed on the detail strip 632.

The check 631, shown in Fig. 11, shows that the customer purchased 77 cents' worth of groceries and then 60 cents' worth of groceries and then $1.50 worth of groceries, all of which are printed on the check 631 but none of which are printed on the detail strip 632. The operator then took a sub-total of these three itmes, which is $2.87 and is printed and indicated on the check 631 and also on the detail strip 632 as the third record from the top. The customer then presented the clerk with $3.00, which is the amount tendered, and that is printed on the check 631 and is also printed on the detail strip as the second item from the top. The total lever 87 then is moved to the item total position. The only key on the keyboard remaining unlocked at this time is the Change key, and the operator presses the Change key 85, which prints 13 cents change on the check 631 and also on the detail strip 632.

This printing mechanism is shown in Fig. 26.

The means for printing on the check and detail strip includes the usual type wheels 633, only a portion of one of which is shown in Fig. 26. All of the hammer mechanism and the check or receipt mechanism is not shown in this application but is fully illustrated and described in the above-mentioned Shipley Patent No. 1,865,147. Therefore, none of the mechanism for printing on the check or receipt strip is shown in this application.

However, a portion of the mechanism for printing on the detail strip and a portion of the mechanism for feeding the detail strip are shown, along with certain controls for controlling the printing on the detail strip and controlling the feeding of the detail strip.

Since it is desirable not to print any of the entry of the regular items, such as meat, produce, miscellaneous, groceries, or tax, on the audit strip or detail strip 632, means is provided to prevent the feeding of the strip during the registration or entry of these particular items, and there is also means to prevent operation of the hammer during the entry of these items, so that they will not be printed on the detail strip. This mechanism is shown in Fig. 26 and will now be described.

The detail strip 632 is fed from a supply roll 640 over guide rolls 641 and is wound upon a receiving roll 642. The means for turning this feed roll counter-clockwise to feed the detail strip thereon includes a feed ratchet 643, driven by a feed pawl 644, carried by an arm 645. This arm 645 is secured to a lever 646, having attached thereto a spring 647, which holds a pin 648 thereon against an arm 649, secured to a shaft 650. Also secured to the shaft 650 is an arm 651, connected by a link 652 to a lever 653, pivoted at 654. This lever carries rollers 655 and 656, which cooperate with plate cams 657 and 658, respectively, secured to a printer drive shaft 659. This shaft is driven clockwise each cycle of operation of the machine from the main drive shaft 50 by means of gears 660, 661, and 662, the latter being secured to the main drive shaft 50 of the machine.

During the rotation of the shaft 659, the lever 653 moves the link 652 to the left and rocks the arms 651 and 649 counter-clockwise, whereupon, during certain operations to be described hereinafter, the spring 647 causes the pin 648 to follow the arm 649, thus rocking the arm 646 and the arm 645 clockwise, which lowers the feed pawl 644 just a little beyond one tooth space of the ratchet 643. As the bell crank 653 is restored to its home position by the cams 657 and 658, the link 652 rocks the arms 651 and 649 clockwise to their normal positions, whereupon the arm 649 engages the pin 648 and rocks the arms 646 and 645 counter-clockwise, thus causing the pawl 644 to drive the ratchet 643 counter-clockwise one step of movement to feed the detail strip 632 and wind it upon the receiving roll 642.

During the entry of the regular items, such as Meat, Produce, Miscellaneous, Tax, and Groceries, the above movement of the arm 646 under the influence of the spring 647 is prevented by the following means:

Integral with the lever 646 is a lip 670, held against a finger 671 on an arm 672 by the spring 647. This arm 672 is pivoted on a stud 673, carried in the printer frame (not shown).

Whenever the transaction differential mechanism is set under control of the Change key, the refund key, the Amount Tendered key, or the No-Change key, which are the positions 1, 2, 3, and 4 of the transaction differential, the finger 671 is moved away from the lip 670 to permit operation of the lever 646 and the arm 645 by the spring 647 in the manner previously described.

The means for removing this finger 671 when the transaction differential is set to any one of its positions 1, 2, 3, and 4 includes a gear segment 675, secured to a short shaft 676, which is supported by the printer frame (not shown) and the left side frame 93 of the machine. Also secured to this shaft 676 is a disk 677, having a surface 678, cooperating with a roller 679 on an arm 680, which is secured to the previously-described arm 672. This surface 678 is of sufficient length to cooperate with the roller 679 when the transaction differential mechanism is in either the first, second, third, of fourth position, and, when in any of such positions, this surface 678, through the roller 679, rocks the arm 680 counter-clockwise, which in turn rocks the arm 672 counter-clockwise and removes the finger 671 from in front of the lip 670 on the lever 646. Therefore the spring 647 can function to cock the arm 645 and get it in position for the pawl 644 to operate the ratchet 643 counter-clockwise to feed the detail strip 632 upon the return movement of the bell crank 653 to its normal position in the manner previously described.

This roller 679 is held against the disk 677, and the finger 671 is held up in front of the lip 670 by means of a spring 681, connected to an arm 682, which is integral with the arm 680.

As above mentioned, whenever the total lever 87 is set in its sub-total position or in the item total position, it is desirable to print the sub-totals and the totals on the detail strip, and it is also therefore necessary to feed the detail strip. It will be recalled that the shaft 212 is moved by the total lever 87, as shown in Fig. 15, whenever the total lever is moved either up into the sub-total position or down into the item total position, through the medium of the link 210 and the arm 211.

Secured to this shaft 212 is an arm 685, having a notch 686, into which normally rests a pin 687 on the arm 682, and held in this notch by the spring 681.

Whenever the total lever is moved up to the sub-total position or down to the item total position, the shaft 212 is rocked either counter-clockwise or clockwise, respectively, whereupon the arm 685 cams the pin 687 out of the notch 686. This pin 687 is carried by an arm 688, pivoted on a stud 689, supported by the printer frame, not shown. This arm 686 also carries a pin 690, against which is held a surface 691 on the arm 682 by the spring 681. Therefore, whenever, the stud 687 is cammed out of the notch 686, the arm 688 is rocked clockwise, whereupon the pin 690 rocks the arm 682 and its integral arm 680 counter-clockwise, and this movement of the arm 680 rocks the arm 672 counter-clockwise and removes the finger 671 from in front of the lip 670, so that the spring 647 may operate the lever 646 and the arm 645 in the manner previously described, to cock the feed pawl 644 and get it ready for feeding during each sub-total operation and during each item total operation when the lever 653 is returned to its normal position.

*Hammer mechanism.*—In connection with the actual printing on the detail strip 632, the hammer 692 only is shown. The mechanism for operating this hammer is identical with the mechanism shown and described in the above-mentioned Shipley Patent No. 1,865,147, and therefore it is not thought necessary to go into any of the mechanism which operates this hammer 692, it being sufficient to say that during each adding operation the hammer is cocked and fired to print upon the detail strip 632 unless there is means to prevent the cocking of this hammer, which will now be described, so that the hammer will not be cocked during operations of the machine wherein the costs of Meat, Produce, Miscellaneous, Tax, or Groceries articles are added in the machine. In other words, when any of the regular items or tax are entered in the machine, it is desirable that these items and tax amounts do not print on the detail strip 632. Therefore, there are means to prevent operation of the hammer 692 during those operations, and means to render the hammer effective, or, in other words, release the hammer so that it may be operated in the usual manner during the time of the entry of any refund, amount tendered, no-change, or change, or also during the printing of totals and sub-totals, all of which should be printed on the detail strip 632, as has been previously described. The mechanism for controlling the hammer 672 will now be described.

This mechanism for controlling the hammer is connected directly to the mechanism for controlling the feeding of the detail strip 632, just described, and therefore, whenever the detail strip is fed, the hammer is operated, and whenever the detail strip is not fed, the hammer is not operated. Therefore, the upper end of the arm 682 carries a pin 693, projecting into a slot in a slide 694, mounted on pins 695, carried by the printer frame. This slide 694 has a finger 696, which rests beneath a projection 697 on the hammer 692, and, as long as this finger 696 is in the position shown, the hammer 692 cannot be cocked and therefore cannot be fired, and no printing will take place on the detail strip as long as the finger 696 is in the position shown in Fig. 26. This slide 694 is operated to be moved to the left whenever the finger 671 is moved from in front of the lip 670 upon operation of the arms 682 and 680 in a counter-clockwise direction, which counter-clockwise movement is controlled by the cam surface 678, by the differential positioning of the transaction differential, as shown, and also by the movement of the shaft 212 under control of the total lever 87, through the arm 688, in the manner previously described.

Therefore, it can be seen from this description that, whenever the feeding mechanism for the detail strip 632 is rendered ineffective, the hammer mechanism for printing on the detail strip is also rendered ineffective; and, vice versa, whenever the feeding mechanism is rendered operable, the hammer is released and rendered operable, so that printing will take place on the detail strip 632.

While the form of mechanism herein shown and described is admirably adapted to fulfill the objects primarily stated, it is to be understood that it is not intended to confine the invention to the particular form of embodiment disclosed herein.

What is claimed is:

1. In a machine capable of indicating, registering, and recording single-item transactions, multiple-item transactions, sub-totals of the amounts involved in said transactions, and also being capable of indicating, registering, and recording the amount tendered, and computing the change from the amount of the sub-total and the amount tendered, the combination of machine-releasing mechanism; an add-subtract totalizer; a total lever having add, sub-total, and total positions; amount keys to determine the amounts to be entered into the plus side or the minus side of said totalizer; a plurality of control keys to select the plus side of said totalizer; a motor bar to select the plus side of said totalizer; means operated by any of said control keys to operate the machine-releasing mechanism during adding operations; means operated by the motor bar to operate the machine-releasing mechanism during add operations and during sub-total operations; means to prevent operation of said motor bar when the total lever is in total position; an Amount Tendered key to select the minus side of said totalizer to cause the amount tendered to be entered in to the minus side of the totalizer to compute the change due the customer; a Change key operable to select the minus side of the totalizer when said totalizer is in a negative condition to cause the amount of change to be indicated and recorded; a No-Change key operable to select the plus side of the totalizer when said totalizer is in a zero condition to indicate and record the fact that there is no change due to the customer; a recording media; means to record on said media all sub-totals, all totals, the amount tendered, the change, or the no-change due the customer; means to prevent the entry of all items on said recording media; means to feed said recording media; and means to prevent the feed of said recording media during the entry of all items of a multiple-item transaction.

2. In a machine capable of indicating, registering, and recording single-item transactions, multiple-item transactions, and sub-totals of the amounts involved in said transactions, and also being capable of indicating, registering, and recording the amount tendered, and computing the change from the amount of the sub-total and the amount tendered, the combination of machine-releasing mechanism; an add-subtract totalizer; a total lever having add, sub-total, and total positions; amount keys to determine the amounts to be entered into the plus side or the minus side of said totalizer; a plurality of control keys to select the plus side of said totalizer; a motor bar to select the plus side of said totalizer; means operated by any of said control keys to operate the machine-releasing mechanism during adding operations; means operated by the motor bar to operate the machine-releasing mechanism during adding operations and during sub-total operations; means to prevent operation of said motor bar when the total lever is in total position; an amount tendered key to select the minus side of said totalizer to cause the amount tendered to be entered into the minus side of the totalizer to compute the change due the customer; a change key operable to select the minus side of the totalizer when said totalizer is in a negative condition to cause the amount of change to be indicated and recorded; a no-change key operable to select the plus side of the totalizer when the totalizer is in a zero condition to indicate and record the fact that there is no change due the customer; means for preventing operation of the Amount Tendered key until after a sub-total operation of the add-subtract totalizer while said totalizer has a plus amount therein; means to prevent operation of the change key when the totalizer is in a plus condition; and means to prevent operation of the no-change key when said totalizer is in a negative condition.

3. In a machine capable of registering single and multiple-item transactions and totals and sub-totals of amounts involved in such transactions, a balance totalizer; machine-releasing mechanism; a total lever having an add position, a sub-total position, and a total position; a plurality of manipulative devices, the operation of any one of which causes an operation of said machine-releasing mechanism; means controlled by the total lever when in add position for preventing operation of a certain plurality of said manipulative devices, and for freeing said certain plurality of devices when said total lever is in its sub-total position or its total position; and means controlled by the algebraic condition of said totalizer for controlling the effectivity of said certain manipulative devices.

4. In a machine of the class described capable of registering single-item and multiple-item transactions, and totals and sub-totals of amounts involved in such transactions, the combination of a balance totalizer; machine-releasing mechanism; a total lever having an add position, a sub-total position, and a total position; a plurality of manipulative devices, including an amount tendered key the operation of any one of which causes an operation of said machine-releasing mechanism; and means for preventing operation of said amount tendered key until after a sub-total operation of the balance totalizer while said totalizer has a plus amount therein.

5. In a machine capable of registering single-item and multiple-item transactions, and totals and sub-totals of amounts involved in such transactions, the combination of a balance totalizer; machine-releasing mechanism; a total lever having an add transaction, a sub-total position, and a total position; a plurality of transaction manipulative devices, including an amount tender key the operation of any one of which causes an operation of said machine-releasing mechanism; a differential mechanism controlled in adding operations by said transaction manipulative devices; a plurality of members for preventing operation of said amount tendered key; means to move one of said members into an ineffective position; and means movable operable under control of the total lever to cause the other of said members to be moved into an ineffective position.

6. In a machine capable of registering single-item transactions and multiple-item transactions, and totals and sub-totals of amounts involved in such transactions, the combination of a balance totalizer to receive value insertions; machine-releasing mechanism; a total lever having an add position, a sub-total position, and a total position; a plurality of manipulative devices, the operation of any one of which causes an operation of said machine-releasing mechanism; a plurality of members for preventing operation of one of said manipulative devices; means to move one of said members into an ineffective position; means movable under control of the total lever to cause the other of said members to be moved into an ineffective position; and means intermediate said one manipulative device and said plurality of members and operated by said one manipulative device to select the minus side of said balance totalizer for value insertion upon operation of said one manipulative device.

7. In a machine capable of registering single and multiple-item transactions and totals and sub-totals of amounts involved in such transactions, the combination of a balance totalizer; machine-releasing mechanism; a total lever having an add position, a sub-total position, and a total position; a plurality of manipulative devices, the operation of any one of which causes an operation of said machine-releasing mechanism; a plurality of members for preventing operation of one of said manipulative devices; lever means operated to move one of said members into an ineffective position; means operable by the total lever for retaining said lever means in its operated position to in turn retain said one member in its ineffective position; and means intermediate said one manipulative device and said plurality of members and operated by said one manipulative device to select the minus side of said balance totalizer upon operation of said one manipulative device to cause the computation of the difference between the amount of the sub-total and the amount entered into the minus side of the totalizer during the operation of the machine when said one manipulative device is operated.

8. In a machine according to claim 3 wherein the means controlled by the total lever includes a slidable bar and two levers actuated by a cam device connected to the total lever; and wherein the means controlled by the algebraic condition of the totalizer includes a linkage intermediate said totalizer and said certain plurality of manipulative devices said linkage having a slidable member which cooperates directly with said last-mentioned manipulative devices.

9. In a machine according to claim 5 wherein the plurality of members includes a slide and a latch cooperating with a pin on a lever operable by the amount tendered key, and wherein the movable means which is operable under control of the total lever includes a differentially adjustable lever connected to the transaction differential mechanism and operable therewith.

10. In a machine according to claim 6 wherein the last mentioned means includes a lever and means intermediate said lever and said one manipulative device and operable by said manipulative device to actuate said lever to control the positioning of the balance totalizer.

11. In a machine according to claim 1 wherein the last mentioned means includes a latching device to control the feed pawl to prevent the operation of the recording media during operations controlled by said plurality of control keys.

12. In a machine capable of registering single and multiple item transactions, totals of such transactions, the amount tendered to pay for the purchases and compute the amount of change; a bank of transaction keys; a transaction differential mechanism controlled by said keys; a balance totalizer; means to record the totals, the amount tendered and the change; and means actuated by said differential mechanism to prevent recording of the items the sum of which makes the total from which the change is computed.

13. In a machine capable of registering single and multiple item transactions, totals of such transactions, the amount tendered to pay for the purchases and compute the amount of change; a normally locked main operating mechanism; a plurality of control keys to release said main operating mechanism; a balance totalizer; an amount tendered key to cause the computation of change; means to record the totals, the amount tendered and the computed change; and means under control of said keys to determine the effectivity of said recording means.

14. In a machine capable of indicating, registering and recording single item transactions, multiple item transactions, sub totals of the amounts involved in said transactions, and also being capable of indicating, registering and recording the amount tendered and computing the change from the amount of the sub-total and the amount tendered, the combination of machine releasing mechanism; an add-subtract totalizer; a total lever having add, sub-total and total positions; amount keys to determine the amounts to be entered into the plus side or the minus side of said totalizer; a plurality of control keys to select the plus side of said totalizer; differential mechanism positioned under control of said control keys; a motor bar to select the plus side of said totalizer; a change key operable to select the minus side of the totalizer when said totalizer is in a negative condition to cause the amount of change to be indicated and recorded; means to record the totals, the amount tendered and the computed change; and means actuated by said differential mechanism when the latter is positioned under control of said control keys to prevent the recording of the items from which the change is computed.

References Cited in the file of this patent

UNITED STATES PATENTS

| | | |
|---|---|---|
| 876,215 | Morris | Jan. 7, 1908 |
| 1,214,568 | Martin | Feb. 6, 1917 |
| 1,348,573 | Martin | Aug. 3, 1920 |
| 2,603,414 | Capellaro | July 15, 1952 |
| 2,657,855 | Winkler | Nov. 3, 1953 |
| 2,698,139 | Goodbar et al. | Dec. 28, 1954 |
| 2,760,722 | Frieberg et al. | Aug. 28, 1956 |

UNITED STATES PATENT OFFICE
CERTIFICATE OF CORRECTION

Patent No. 2,853,232                                              September 23, 1958

Mayo A. Goodbar et al.

It is hereby certified that error appears in the printed specification of the above numbered patent requiring correction and that the said Letters Patent should read as corrected below.

Column 4, line 51, for "shown" read -- show --; column 9, line 59, for "amount to" read -- amount of --; column 14, line 42, for "multi-item" read -- multiple-item --; column 28, line 16, strike out "of", second occurrence; line 33, for "itmes" read -- items --; column 29, line 49, for "of fourth" read -- or fourth --; column 31, line 36, strike out "to", first occurrence; column 32, line 34, for "transaction" read -- position --; line 36, for "tender" read -- tendered --.

Signed and sealed this 9th day of December 1958.

(SEAL)
Attest:

KARL H. AXLINE                                                   ROBERT C. WATSON
Attesting Officer                                            Commissioner of Patents